United States Patent
Ota et al.

(10) Patent No.: US 7,388,877 B2
(45) Date of Patent: Jun. 17, 2008

(54) PACKET TRANSFER APPARATUS

(75) Inventors: Migaku Ota, Yokohama (JP); Hiroaki Miyata, Yokohama (JP); Jun Nakajima, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 889 days.

(21) Appl. No.: 10/898,430

(22) Filed: Jul. 26, 2004

(65) Prior Publication Data
US 2005/0163146 A1 Jul. 28, 2005

(30) Foreign Application Priority Data
Jan. 26, 2004 (JP) .............................. 2004-017495

(51) Int. Cl.
*H04J 3/26* (2006.01)
*H04L 12/56* (2006.01)
*H04L 12/66* (2006.01)

(52) U.S. Cl. ..................... 370/432; 370/397; 370/463

(58) Field of Classification Search .................. None
See application file for complete search history.

(56) References Cited

U.S. PATENT DOCUMENTS 6,094,437 A * 7/2000 Loehndorf et al. ......... 370/420
6,157,649 A * 12/2000 Peirce et al. ................ 370/401
6,463,475 B1 * 10/2002 Calhoun ..................... 709/227
6,970,459 B1 * 11/2005 Meier ......................... 370/389
6,996,110 B1 * 2/2006 Amara et al. ............... 370/396
7,020,084 B1 * 3/2006 Tanaka et al. .............. 370/235
7,299,301 B1 * 11/2007 Verma et al. ............... 709/249

FOREIGN PATENT DOCUMENTS

JP 2002-164930 6/2002

* cited by examiner

Primary Examiner—Kwang Bin Yao
Assistant Examiner—Warner Wong
(74) Attorney, Agent, or Firm—Antonelli, Terry, Stout & Kraus, LLP.

(57) ABSTRACT

An LAC manages multicast destinations, and forms and distributes copies of the multicast packets. An L2TP tunnel and an L2TP session are formed between LAC 1-*i* and LNS 2-*i*, and LNS 2-*i* is connected to network NW2 such as the Internet. Data is transferred between a subscriber and the network through the L2TP connection. LNS 2-*i* and sever S1 are connected through network NW2 which has routers. A packet transfer apparatus enables LAC 1-*i* to manage subscriber information and to form and distribute copies of the packets to the subscribers when server S1 on network NW2 distributes multicast packets of a program or the like to the subscribers.

8 Claims, 28 Drawing Sheets

| LNS ADDRESS /1211 | MC G ADDRESS (V4/V6) /1212 | MC SESSION LNS ADDRESS /1213 | MC SESSION STARTED FLAG /1214 | UPSTREAM L2TP TUNNEL ID /1215 | UPSTREAM L2TP SESSION ID /1216 |
|---|---|---|---|---|---|
| IP-LNS 1-1 | G1 | IP-LNS 1-1 | 0 (→1) | - (→3) | - (→7) |
| IP-LNS 2-1 | G1 | IP-LNS 2-1 | 0 | | |
| IP-LNS 1-1 | G2 | IP-LNS 2-1 | 1 | 5 | 4 |
| IP-LNS 2-1 | G2 | IP-LNS 2-1 | 1 | 5 | 4 |
| IP-LNS 3-1 | D.C | IP-LNS 3-1 | 1 | 11 | 22 |
| IP-LNS 4-1 | D.C | IP-LNS 3-1 | 1 | 11 | 22 |
| IP-LNS 5-1 | D.C | IP-LNS 5-5 | 0 | | |

←—— SEARCH KEY ——→ ←———— SEARCH RESULT ————→

FIG. 9

| LAC ADDRESS /1231 | DOWNSTREAM L2TP TUNNEL ID /1232 | DOWNSTREAM L2TP SESSION ID /1233 | MC SESSION FLAG /1234 | OUTPUT LINE INFORMATION (OUTPUT LINE TYPE, OUTPUT INTERFACE, PORT, ETC.) /1235 |
|---|---|---|---|---|
| IP-LAC 1-1 | 8 | 3 | 1 | |
| IP-LAC 1-1 | 5 | 1 | 0 | ETHERNET / LINE INTERFACE #3/PORT #2 |
| IP-LAC 1-1 | 5 | 3 | 0 | ATM / LINE INTERFACE #6/PORT #0 |
| IP-LAC 1-2 | 21 | 15 | 1 | |

←——————— SEARCH KEY ———————→←——— SEARCH RESULT ———→

FIG. 10

| LNS ADDRESS /1251 | DESTINATION ADDRESS /1252 | OUTPUT INTERFACE /1253 | V6 MC INDEX /1254 |
|---|---|---|---|
| IP-LNS 2-1 | G6-1 | 1,3,n | k |
| IP-LNS 2-1 | G6-2 | 1,4 | 1 |
| IP-LNS 3-1 | G6-3 | 2 | 5 |
| ... | ... | ... | ... |

←———— SEARCH KEY ————→←———— SEARCH RESULT ————→

FIG. 13

PACKET TRANSFER APPARATUS

BACKGROUND OF THE INVENTION

1. Field of the Invention

The present invention relates to packet transfer apparatuses, and more specifically, to a packet transfer apparatus which terminates Layer 2 Tunneling Protocol (L2TP) on a subscriber side.

2. Description of the Related Art

One known system uses Point-to-Point Protocol (PPP) to authenticate a subscriber as a user when a subscriber terminal is connected via an Internet service provider (ISP) to the Internet. PPP is a protocol for making a one-to-one connection between a subscriber terminal and an ISP, at a level equivalent to layer 2. PPP was originally used in an environment where a terminal is connected directly to an ISP access point by phone line, authenticated, and then connected to the Internet. As continuous access to the Internet has become common, the connection between the subscriber terminal and the ISP server is currently made through an access carrier network utilizing Internet Protocol (IP), besides the telephone network. Because the access carrier network is formed in layer 3, a means for transferring a PPP packet to the PPP terminating apparatus of the ISP is required to perform PPP authentication through the access carrier network. L2TP can be used as the transfer means.

L2TP allows a logical private line to be formed between a subscriber terminal and an ISP in the access carrier network and allows PPP to be terminated at an exit from the access carrier network (to the ISP side). The logical private line is referred to as an L2TP tunnel and an L2TP session. An L2TP connection is made by an L2TP terminating apparatus (L2TP access concentrator (LAC)) on the subscriber side, and an L2TP terminating apparatus (L2TP network server (LNS)) on the ISP side. A PPP packet is transferred by the L2TP connection and terminated by the LNS. Because the LNS terminates both L2TP and PPP on the ISP side, the number of L2TP sessions increases with an increase in the number of subscribers. PPP connection extension by L2TP and the functions of the LAC and LNS are described in Request for Comment (RFC) 2661.

Japanese Unexamined Patent Application Publication No. 2002-164930 discloses a communication method utilizing an IP tunneling technology such as L2TP for connecting an ISP and a multicast protocol or a multicast routing protocol such as Internet Group Management Protocol (IGMP) incorporated in a general router or layer-3 switch, for distributing multicast contents.

In an environment in which an L2TP connection is made in the access carrier network to connect a subscriber and an ISP, there is generally a high demand for reducing traffic between the LAC and the LNS, in order to reduce the cost of the access carrier network.

In a system where a server on the Internet multicasts a program and the subscribers receive multicast packets, traffic between the LAC and the LNS would be reduced by copying the multicast packets in the LAC and distributing the copied packets to the subscribers. In an access network of the L2TP type, a user IP packet is transferred by a PPP connection, but a general LAC just sends and receives the PPP connection and does not perform processing on the IP packet level. The LAC cannot manage multicast destinations. According to an IETF draft (draft-ietf-12tpext-mcast-03.txt), the LNS manages and gives a list of multicast destinations to the LAC, so that the LAC can distribute copied multicast packets. Each time a request is made to add or delete a subscriber to or from the multicast packet group in this system, the LNS must update the destination list and send the updated list to the LAC. This sequence causes a delay in actual addition or deletion of the subscriber and wastes a frequency band for transferring the destination list.

SUMMARY OF THE INVENTION

Accordingly, it is an object of the present invention to enable a LAC to manage multicast destinations and to distribute copied multicast packets.

In an aspect of the present invention, the problems described earlier can be solved by providing the LAC with the following means. A means for snooping into a PPP packet and managing subscriber information of a multicast group is provided in the LAC. A means for terminating an Internet Group Management Protocol (IGMP) packet and a Multicast Listener Discovery (MLD) packet sent from a subscriber is also provided in the LAC. This prevents a copy of a packet from being created for each subscriber by the LNS in the multicast packet distribution when an IGMP or MLD packet such as an IGMP or MLD join message issued by a subscriber who wants to join the multicast group reaches the LNS. In addition, a means for making an Internet connection request to the LNS is provided in a virtual terminal in the LAC. This allows a multicast L2TP tunnel and a multicast L2TP session to be formed, and the LAC can receive a multicast packet from the LNS through the L2TP connection. A means for issuing an IGMP or MLD packet to the LNS is also provided in the virtual terminal in the LAC, so that a multicast packet can be transferred to a multicast L2TP connection after the connection is established.

In order to implement the means described above, the apparatus of the present invention includes a plurality of line interface blocks, a plurality of packet processing blocks, an internal switch, and a control unit, in terms of hardware. An external control terminal can be connected. The apparatus has a LAC function, a function to snoop into an IGMP packet sent from the subscriber side, a function to terminate the IGMP packet sent from the subscriber side, a function to snoop into an MLD packet sent from the subscriber side, a function to terminate the MLD packet sent from the subscriber side, a packet copy function, and a function to add a header. The apparatus holds the following tables in a memory: an IPv4 LNS-multicast group information table and an IPv6 LNS-multicast group information table for managing sessions with the LNS for a multicast group, an L2TP decapsulation table for decapsulating an L2TP packet, an IPv4 multicast routing table and an IPv6 multicast routing table for determining multicast destinations, and multicast index tables.

In another aspect of the invention, the packet transfer apparatus includes, for example, a plurality of protocol processing units connected to different IP networks and a switch for exchanging IP packets among the protocol processing units, in terms of hardware. The packet transfer apparatus is provided on the subscriber side of a network where an L2TP tunnel and an L2TP session are formed, and terminates L2TP. The packet transfer apparatus has a means for terminating an IGMP packet and an MLD packet sent from the subscriber side, a means for forming a multicast L2TP tunnel and a multicast L2TP session, a means for managing the information of subscribers belonging to the multicast group, a means for generating and sending an IGMP or MLD packet through the multicast L2TP tunnel and the multicast L2TP session, a means for making and distributing a copy of the multicast packet received through the multicast L2TP tunnel and the multicast L2TP session to the subscribers in accordance with the subscriber information of the multicast group.

In another aspect of the invention, the packet transfer apparatus has a table for managing the multicast group, the addresses of L2TP terminating apparatuses which can receive a multicast packet of the group on the Internet side, and information used to choose an L2TP terminating apparatus to which a multicast L2TP tunnel and a multicast L2TP session are formed, from the L2TP terminating apparatuses which can receive multicast packets on the Internet side. The load of a multicast packet transfer line can be distributed over the packet transfer apparatus and the plurality of L2TP terminating apparatuses on the Internet side.

In another aspect of the invention, the packet transfer apparatus has a table for managing information used to choose an L2TP terminating apparatus on the Internet side, to which a multicast L2TP tunnel and a multicast L2TP session are formed, if an ISP has a plurality of L2TP terminating apparatuses on the Internet side, for a single L2TP terminating apparatus on the subscriber side. Accordingly, multicast packet transfer lines can be concentrated on a single L2TP terminating apparatus on the Internet side.

In another aspect of the invention, the packet transfer apparatus has a line fault detection means. A redundant multicast L2TP tunnel and a redundant multicast L2TP session can be configured with one or more L2TP terminating apparatuses on the Internet side.

The packet transfer apparatus forms a multicast L2TP tunnel and a multicast L2TP session to an L2TP terminating apparatus on the Internet side. A conventional multicast L2TP terminating apparatus on the Internet side can be used.

The foregoing object is achieved by the present invention through the provision of a packet transfer apparatus for terminating Layer 2 Tunneling Protocol (L2TP), disposed on a subscriber side of a network in which an L2TP tunnel and an L2TP session are formed. The packet transfer apparatus has an LNS-multicast group information table for storing an L2TP network server (LNS) address to which a multicast L2TP connection is made, an L2TP connection established flag, an upstream L2TP tunnel identifier, and an upstream L2TP session identifier, for the address of an LNS which a subscriber terminal belongs to and the address of a multicast group; an L2TP decapsulation table for storing holds a multicast session flag, which indicates whether a multicast L2TP connection is made, for an LAC address, a downstream L2TP tunnel identifier, and a downstream L2TP session identifier; a multicast table for storing line information including the information of an output port and an output interface to which copies of multicast packets are distributed, for a multicast LNS address and a multicast group address; and a protocol processing unit which can access each of the tables and is connected to a network through an interface. The protocol processing unit includes a means for receiving a packet of a multicast reception request message sent to join a multicast group, by a subscriber terminal which wants to receive a multicast packet, the packet including the address of an LNS which the subscriber terminal belongs to and the address of the multicast group; a means for checking a header and a data block of the packet sent from the subscriber terminal to see whether the packet includes a multicast reception request message, and, if the multicast reception request message is included, for terminating the received packet without performing L2TP encapsulation; a means for checking the L2TP connection established flag related to the received LNS address and multicast group address in the LNS-multicast group information table to see whether an L2TP connection for the multicast group has already been made; a means for adding line information including the information of the output port and the output interface of the subscriber terminal sending a multicast reception request message, to the multicast table, corresponding to the LNS address and multicast group address, if an L2TP connection has already been made; a means for receiving a multicast packet from a server, for searching through the L2TP decapsulation table by L2TP tunnel identifier, L2TP session identifier, and destination address in the header, and for checking the multicast session flag to see whether the distributed packet is a multicast packet received through the multicast L2TP connection; and a means for performing L2TP decapsulation, for searching the multicast table for line information including the information of the output port and the output interface of a destination subscriber terminal, in accordance with the LNS address and multicast group address, and for making and distributing copies of a multicast packet to the subscriber terminals corresponding to the line information if the packet is determined to be a multicast packet.

Conventionally, in multicast L2TP communication, the LAC cannot manage multicast destinations when distributing multicast packets. The present invention enables an IGMP or MLD packet sent from a subscriber to be selectively taken out of a PPP connection, so that the LAC can implement a multicast packet distribution function while managing multicast destinations. This causes the multicast destination list to be updated earlier and also causes traffic in the access carrier network to be reduced by the amount of sequence for synchronizing the multicast destination list between the LNS and the LAC, which is described in an IETF draft (draft-ietf-12tpext-mcast-03.txt). A plurality of L2TP sessions configured between one LAC and a plurality of LNSs, if any, are consolidated to a single multicast L2TP session between LAC and LNS. In addition, the load of the line can be distributed over the plurality of L2TP sessions, so that the frequency band of the access carrier network can be used flexibly and effectively. The present invention is applied to the LAC only, and the LNS having the conventional multicast function can be used together with the LAC.

BRIEF DESCRIPTION OF THE DRAWINGS

FIG. 9 is a view showing a configuration of an LNS-multicast group information table.

FIG. 10 is a view showing a configuration of an L2TP decapsulation table.

FIG. 13 is a view showing a configuration of a v6 multicast routing table.

DESCRIPTION OF THE PREFERRED EMBODIMENTS

1. System Configuration

Figure 1:
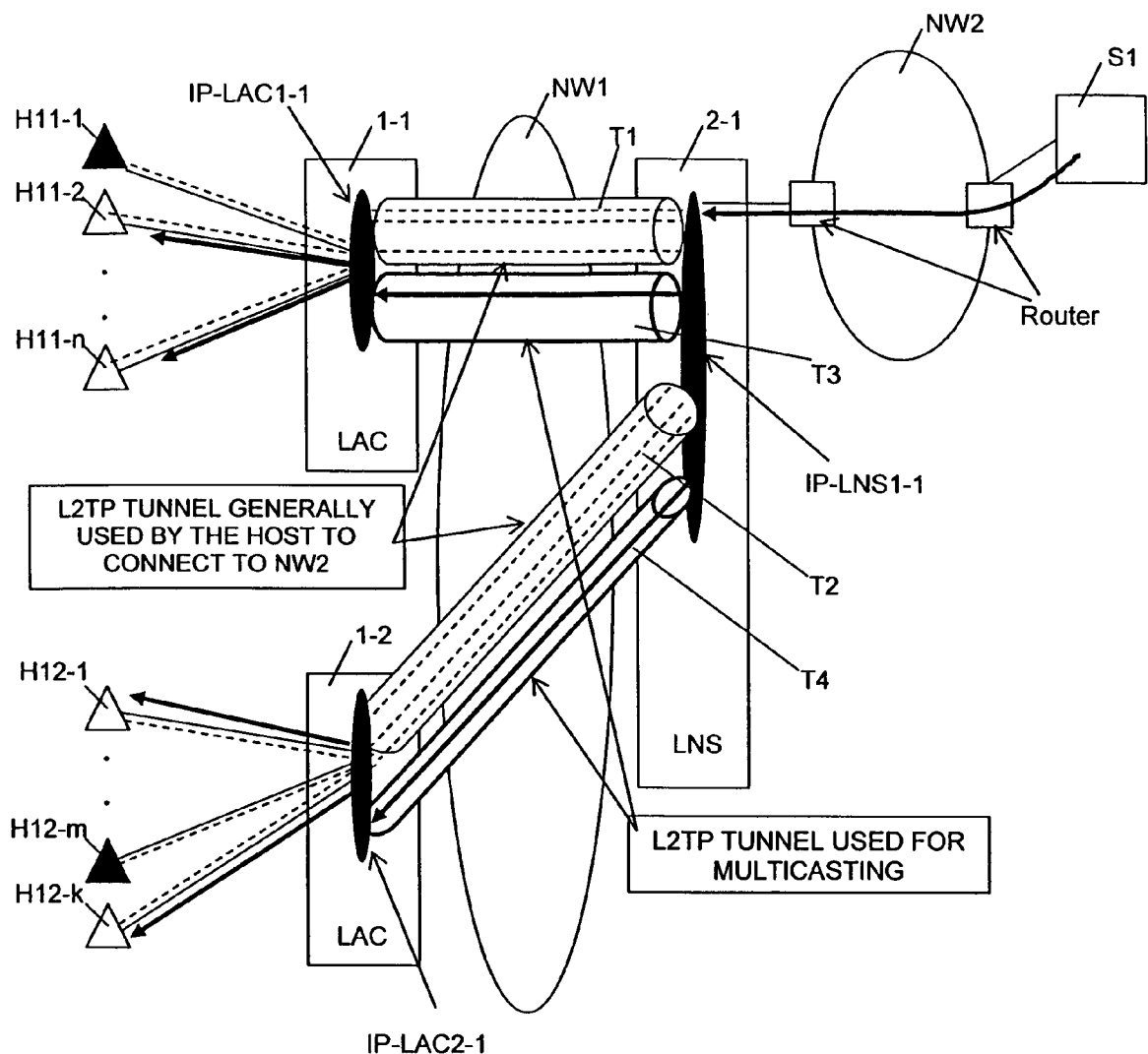
FIG. 1 is a view showing an example configuration of a network where one embodiment of the present invention is applied.

FIG. 1 shows an example configuration of a network where one embodiment of the present invention is applied. The example network is configured with subscriber terminals H1$i$-$j$, LACs 1-$i$, LNSs 2-$i$, server S1, access carrier network NW1, and network NW2 such as the Internet (i=1 to n; j=1 to n). The subscriber terminals use PPP and are connected through an ISP to the Internet by IP. An L2TP logical path is formed in access carrier network NW1 between a subscriber and an LNS of the ISP. An L2TP tunnel and an L2TP session are formed between LAC 1-$i$ and LNS 2-$i$, and LNS 2-$i$ is connected to server S1 through network NW2 with routers. Data is transferred between each subscriber and the Internet through the L2TP connection. When server S1 on network NW2 distributes the multicast packets of a program or the like to the subscribers, the packet transfer apparatus according to this embodiment can make and distribute a copy of the packet to each subscriber while managing the subscriber information by means of LAC 1-$i$.

Figure 2:
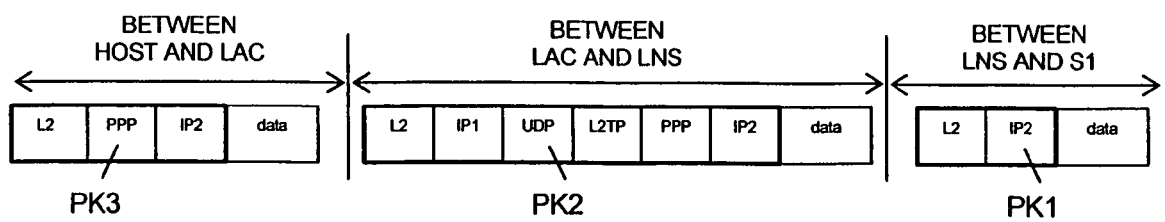
FIG. 2 is a view showing packet formats.

FIG. 2 shows packet formats. A packet is transmitted in different formats PK1, PK2, and PK3, depending on the sending and receiving apparatuses.

Server S1 distributes a packet in the PK1 format, in accordance with the IP addressing rule of NW2. LNS 2-1 sends the packet to LAC 1-$i$ in the PK2 format: The packet is encapsulated by a PPP header, L2TP header, and IP packet of NW1. LAC 1-$i$ performs L2TP decapsulation and distributes the packet to the subscriber terminals in the PK3 format: A PPP header and an IP header determined by the IP addressing rule of NW2 are added. An L2 header is given in accordance with the layer-2 format of the corresponding network.

Figure 6:
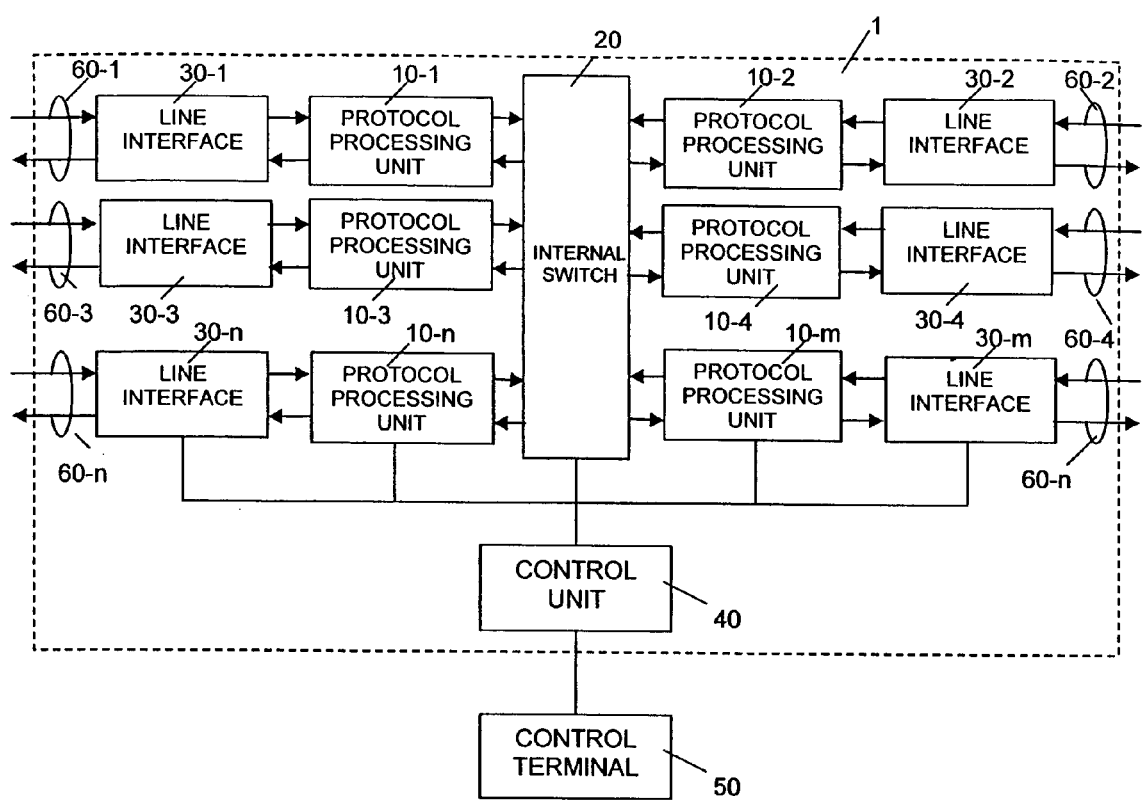
FIG. 6 is a view showing an example configuration of a packet transfer apparatus.

FIG. 6 shows a configuration of the packet transfer apparatus in an LAC, according to the embodiment of the present invention.

The packet transfer apparatus 1 includes a plurality of input/output lines 60-$i$, a plurality of line interfaces 30-$i$, a plurality of protocol processing units 10-$i$, an internal switch 20, and a control unit 40 for controlling the internal switch, protocol processing units, and line interfaces, and can be controlled by an external control terminal 50.

The line interface 30-$i$ regenerates an IP packet from a signal received from the IP network and transfers the packet to the protocol processing unit 10-$i$. The line interface 30-$i$ also converts an IP packet output from the protocol processing unit 10-$i$ to the communication frame format complying with the communication protocol of the input/output line 60-$i$, such as Ethernet and ATM, and sends the communication frame to the IP network.

Each time an IP packet is received from the line interface 30-$i$, the protocol processing unit 10-$i$ references a routing table in accordance with the destination IP address included in the IP header and obtains an output port number. Besides this IP routing, the protocol processing unit 10-$i$ implements multicast packet routing and multicast packet copy processing, which will be described later. The control unit 40 monitors the statuses of the protocol processing units 10-$i$ and the internal switch 20, and reports the in-node statuses to the control terminal 50. The control unit 40 also specifies control parameters of each protocol processing unit, under an instruction from the control terminal 50. The control unit 40 has a function to perform protocol processing which requires status monitoring such as L2TP tunnel connection. The internal switch 20 receives a packet from a protocol processing unit 10-$i$ and transfers the packet to the protocol processing unit 10-$i$ connected to the line interface 30-$i$ including the corresponding output port.

Figure 7:
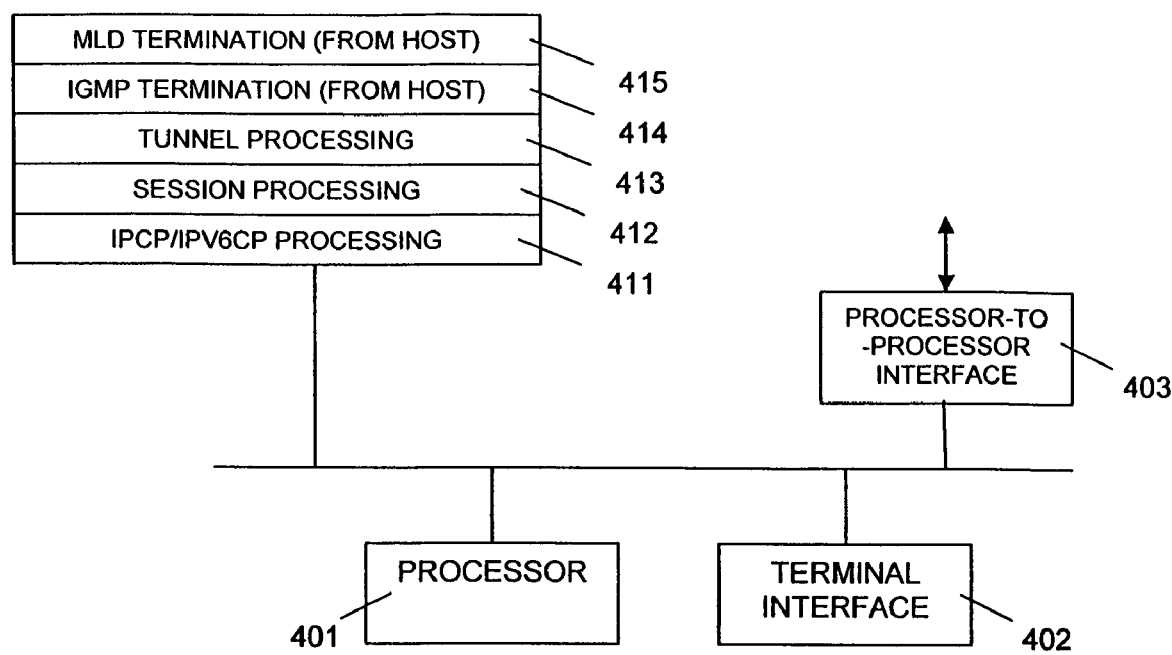
FIG. 7 is a view showing a configuration of a control unit of the packet transfer apparatus.

FIG. 7 shows a configuration of the control unit 40.

The control unit 40 includes a processor 401 for executing processing, memory blocks 41$i$ where the contents of processing are written, an interface 402 with the control terminal 50, and a processor-to-processor interface 403 used for communication with the protocol processing processor of the protocol processing unit 10-$i$. The memory blocks of the control unit 40 have processing functions, such as IGMP termination 414 from a subscriber, MLD termination 415 from a subscriber, tunnel processing 413 for forming an L2TP tunnel to an LNS, session processing 412 for starting an L2TP session with an LNS, and IPCP/IPv6CP processing 411 for obtaining an IP address.

Figure 8:
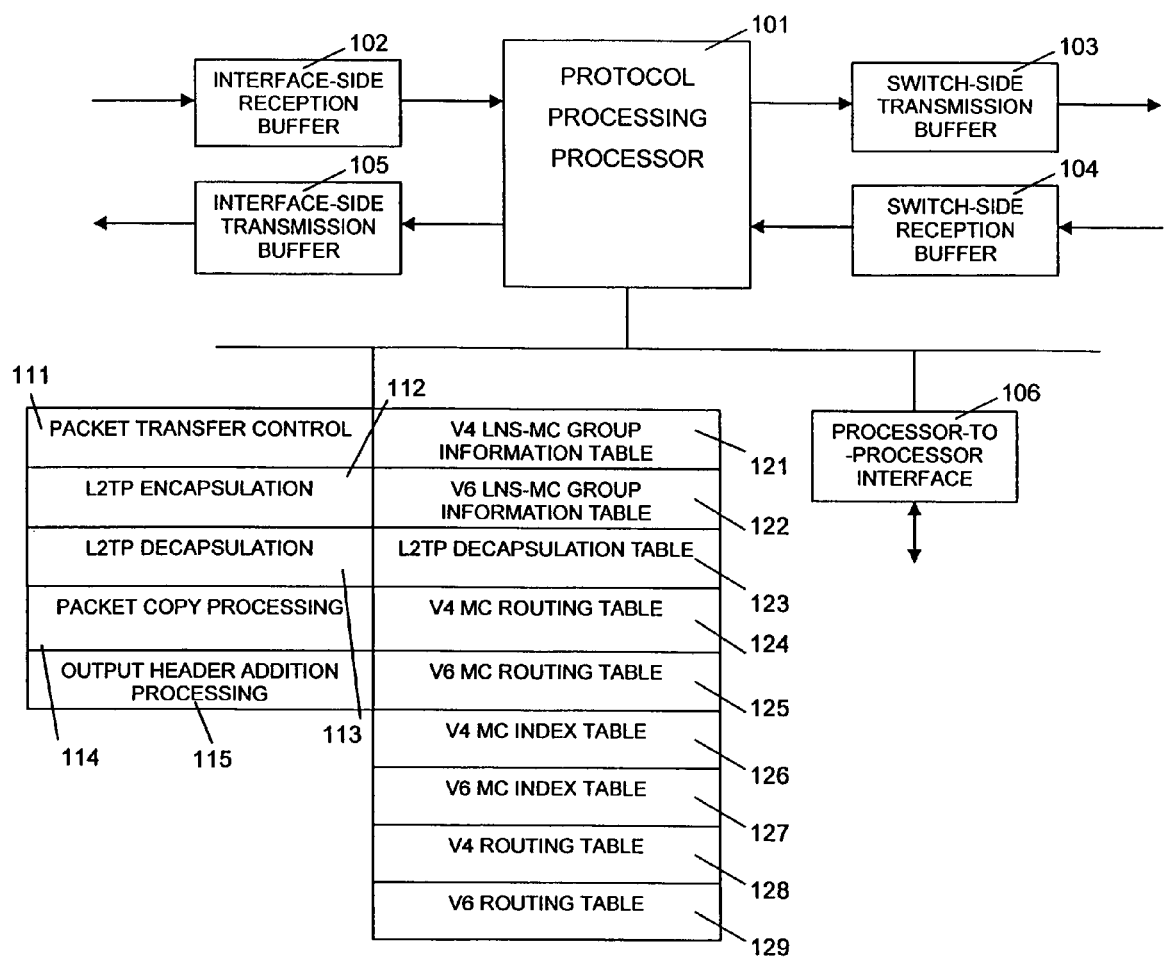
FIG. 8 is a view showing a configuration of a protocol processing unit of the packet transfer apparatus.

FIG. 8 shows a configuration of the protocol processing unit.

The protocol processing unit 10-$i$ includes an interface-side reception buffer 102, a protocol processing processor 101, a switch-side transmission buffer 103, a switch-side reception buffer 104, an interface-side transmission buffer 105, a processor-to-processor interface 106, and memory blocks. The reception buffer 102 receives a packet from the line interface 30-$i$; the protocol processing processor 101 executes protocol processing; the transmission buffer 103 sends a packet to the internal switch 20; the reception buffer 104 receives a packet from the internal switch 20; the transmission buffer 105 sends packets to the line interface 30-$i$; and the processor-to-processor interface 106 is used for communication between the protocol processing processor 101 and the processor of the control unit 40.

The memory blocks implement the functions of packet transfer control processing 111, L2TP encapsulation 112, L2TP decapsulation 113, packet copy processing 114 in multicast distribution, and output header addition processing 115. The memory blocks also hold tables used for the processing: a v4 LNS-multicast (MC) group information table 121, a v6 LNS-multicast (MC) group information table 122, an L2TP decapsulation table 123, a v4 multicast routing table 124, a v6 multicast routing table 125, a v4 multicast index table 126, a v6 multicast index table 127, a v4 routing table 128, and a v6 routing table 129. The v4 LNS-multicast (MC) group information table 121 and v6 LNS-multicast group (MC) information table 122 are used to determine from which LNS a multicast group is received. The L2TP decapsulation table 123 is used to determine whether the L2TP packet to be decapsulated is of a multicast session or unicast session. The v4 multicast routing table 124 and v6 multicast routing table 125 are used to determine the line interface 30-$i$ to which a multicast packet is transferred. The v4 multicast index table 126 and v6 multicast index table 127 are used to determine the output port and output header of a multicast packet. The v4 routing table 128 and v6 routing table 129 are used when a general unicast packet is transferred.

The v4 multicast routing table 124, v6 multicast routing table 125, v4 multicast index table 126, and v6 multicast index table 127 will be hereafter collectively referred to as a v4/v6 multicast table. An apparatus supporting one protocol of IPv4 and IPv6 may not contain tables for the other protocol.

The tables will next be described in further detail. A search key used in each table and data obtained as a search result will also be indicated. A flag may be set to "0"/"1", "1"/"0", "ON"/"OFF", or "OFF"/"ON".

Figure 11:
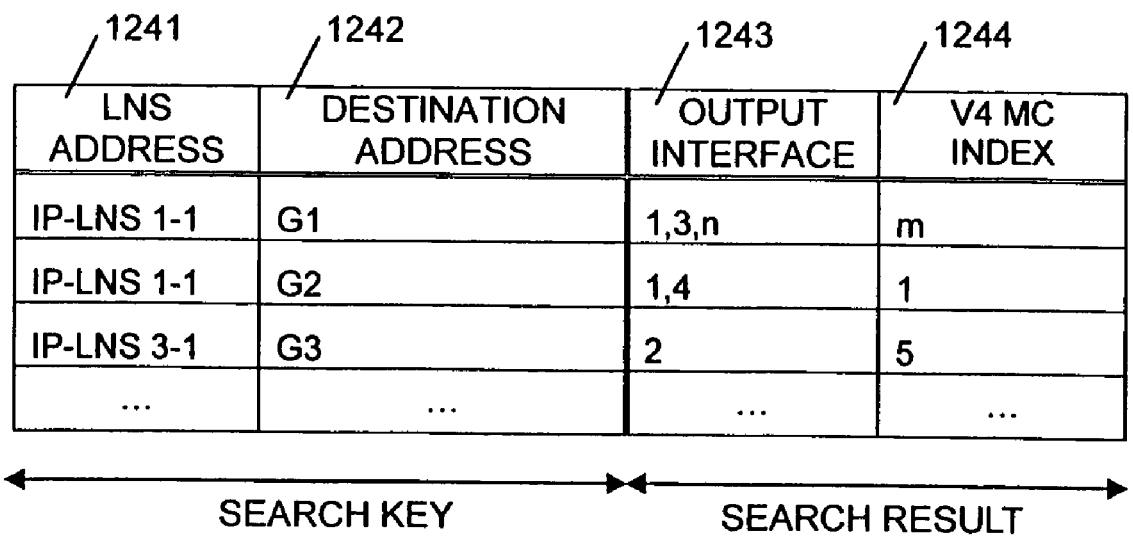
FIG. 11 is a view showing a configuration of a v4 multicast routing table.
Figure 12:
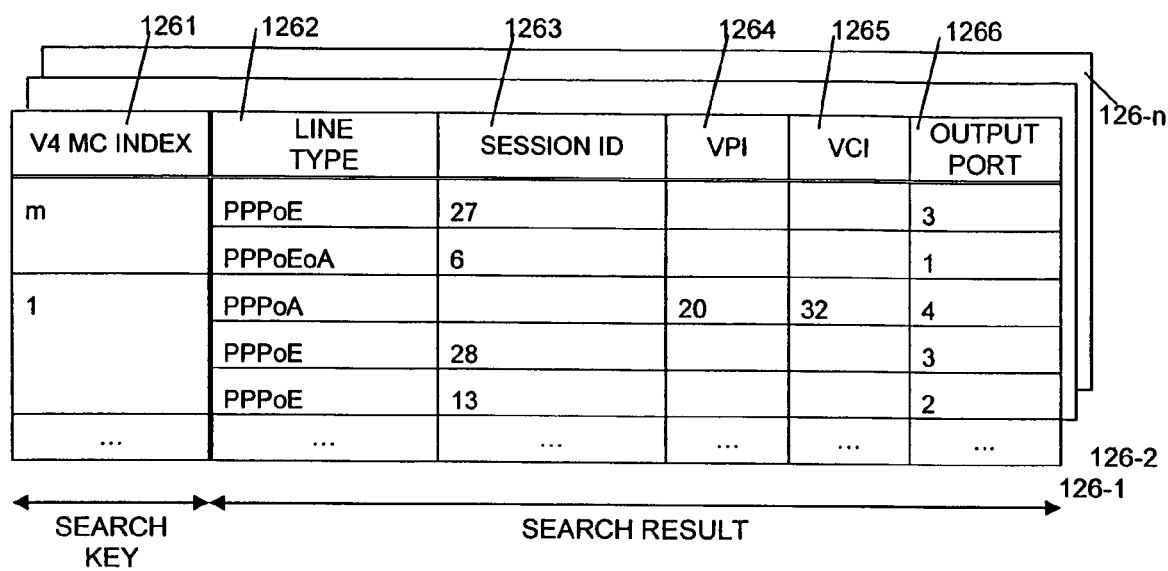
FIG. 12 is a view showing a configuration of a v4 multicast index table.
Figure 14:
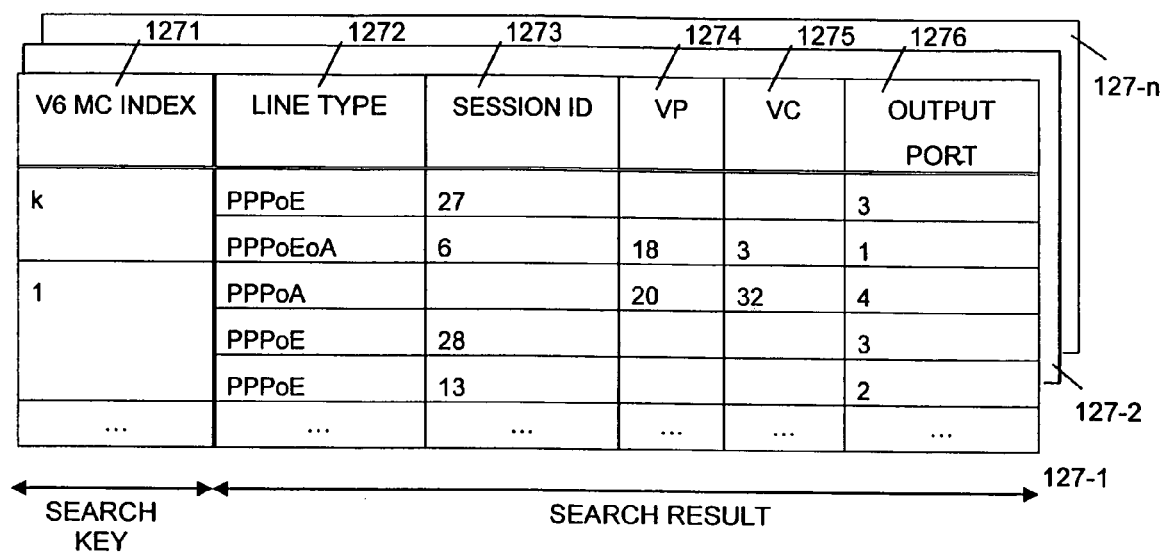
FIG. 14 is a view showing a configuration of a v6 multicast index table.

FIG. 9 shows a configuration of the LNS-multicast group information table. FIG. 10 shows a configuration of the L2TP decapsulation table. FIG. 11 shows a configuration of the v4 multicast routing table. FIG. 12 shows a configuration of the v4 multicast index table. FIG. 13 shows a configuration of the v6 multicast routing table. FIG. 14 shows a configuration of the v6 multicast index table.

FIG. 12 shows that tables 126-1 to 126-$n$ are provided for the output interfaces indicated in the output interface 1243 in FIG. 11. FIG. 14 shows that tables 127-1 to 127-$n$ are provided for the output interfaces indicated in the output interface 1253 in FIG. 13.

2. Outline of Operation

Figure 3:
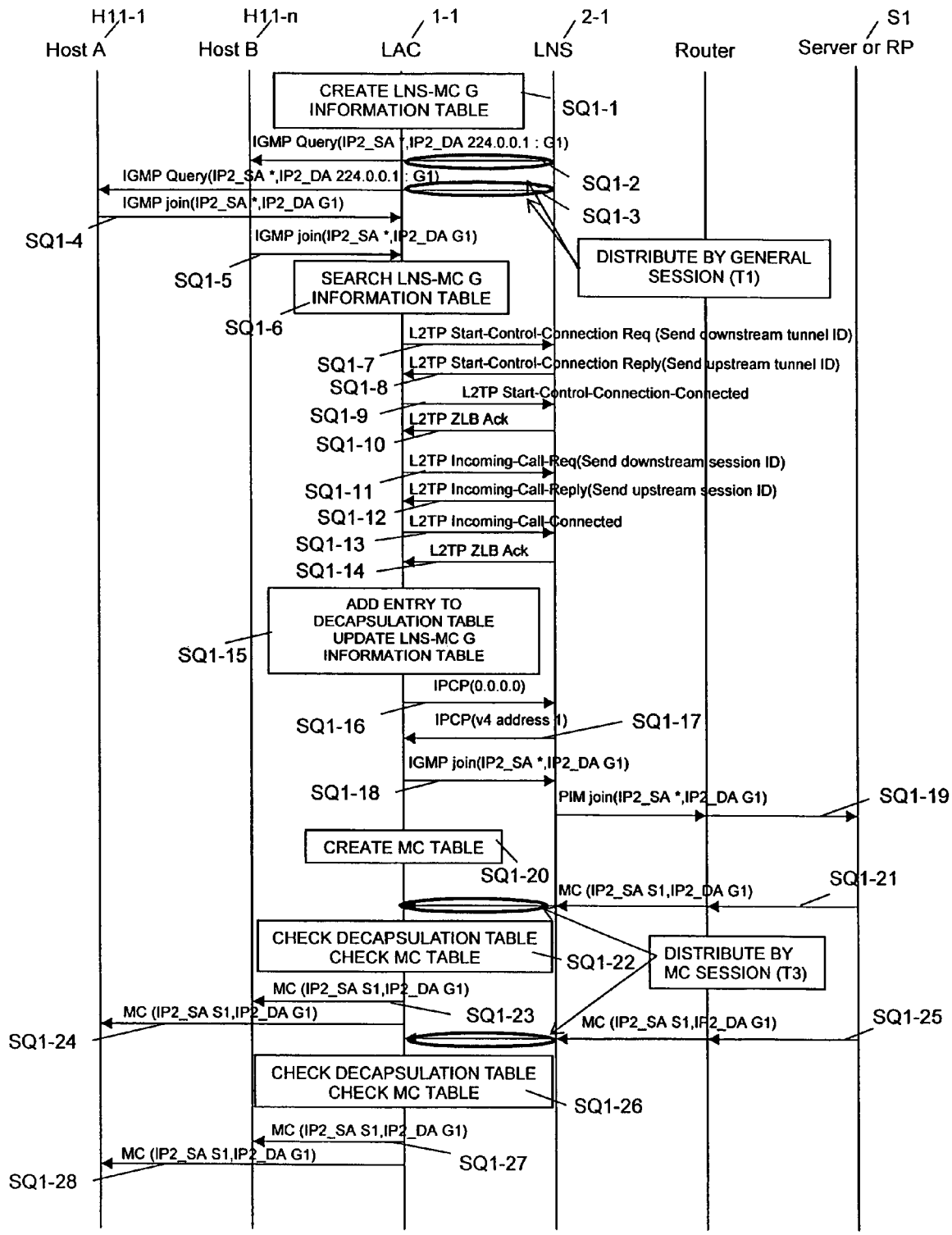
FIG. 3 is a view showing the basic sequence until a subscriber receives a multicast packet.

FIG. 3 shows the basic sequence until a subscriber receives a multicast packet in the example network described above. An example sequence under IGMP will be described below, but the sequence can be applied to MLD and other appropriate multicast protocols.

In step SQ1-1, the control terminal of LAC 1-1 creates an entry in the LNS-multicast group information table 121 or 122 (FIG. 8) on the LAC. The table contains information of LNS or LNSs ready for reception in each multicast group and defines the LNS to which a multicast L2TP connection is made from the LAC, or the LNS from which multicast packets are received when there is a plurality of LNSs ready for reception. FIG. 9 shows a detailed example of the LNS-multicast group information table.

If a subscriber belonging to IP-LNS1-1 of LNS 2-1 (the L2TP session started to connect to NW2 is terminated at IP address IP-LNS1-1 on the LNS side) wants to receive the packets of multicast group G1, LNS address IP-LNS1-1 of the LNS including the subscriber is specified as the LNS address 1211 in the LNS-multicast group information table (FIG. 9). Desired group address G1 is specified as the multicast group address 1212. The IP address of LNS to which an L2TP connection is made for multicast group G1 is specified as the multicast session LNS address 1213. If a multicast L2TP connection is made to IP-LNS1-1, IP-LNS1-1 is specified as the multicast session LNS address 1213. While an L2TP connection to subscribers belonging to LNS1-1 for multicast group G1 is not established, the multicast session started flag 1214 is tied to "0". In the meantime, the values of the upstream L2TP tunnel ID 1215 and the upstream L2TP session ID 1216 are invalid. When the L2TP connection is established, the multicast session started flag 1214 is set to "1".

A multicast packet can be received on two occasions: when LNS 2-1 periodically checks whether any subscriber wants to receive a multicast packet and when a subscriber terminal voluntarily makes a multicast packet reception request.

In steps SQ1-2 and SQ1-3, in order to check whether any subscriber wants to receive a multicast packet, LNS 2-1 sends an IGMP query packet to each subscriber H11-$i$ through existing L2TP tunnel and L2TP session to each subscriber (L2TP session in T1, in FIG. 1).

In steps SQ1-4 and SQ1-5, a. subscriber who wants to receive a multicast packet of multicast group G1 returns an IGMP join message. If a subscriber terminal voluntarily makes a multicast packet reception request, the sequence starts from this step.

When a packet is received from a subscriber, LAC 1-1 generally performs L2TP encapsulation and transfers the packet through L2TP connection T1, through which the IGMP query is sent. In steps SQ1-4 and SQ1-5 of this embodiment, however, the contents of the IP2 header and the data block in the PK3 format of the packet sent from the subscriber are checked to see whether the packet is an IGMP loin message or not. If so, L2TP encapsulation is not performed, and the IGMP packet is terminated. In step SQ1-6, the multicast session started flag 1214 in the LNS-multicast group information table (FIG. 9) is checked to see whether the L2TP connection for multicast group G1 has already been made.

If the L2TP connection has not yet been made, processing is performed to make multicast L2TP connection T3 to the LNS having the multicast session LNS address 1213 specified in the LNS-multicast group information table (FIG. 9) in steps SQ1-7 to SQ1-14. The connection processing is performed under L2TP. The connection processing determines the upstream (LAC to LNS) L2TP tunnel ID, the upstream L2TP session ID, the downstream (LNS to LAC) L2TP tunnel ID, and the downstream L2TP session ID. In steps SQ1-15, the corresponding items are updated in the LNS-multicast group information table (FIG. 9) and added to the L2TP decapsulation table (FIG. 10). In the LNS-multicast group information table (FIG. 9), the multicast session started flag 1214 is set to "1", indicating that the session has already started, and the upstream L2TP tunnel ID 1215 and the upstream L2TP session ID 1216 are updated to the values determined above. In the L2TP decapsulation table (FIG. 10), the LAC address 1231 is set to IP-LAC1-1, which is the IP address of the LAC terminating the L2TP connection; the downstream L2TP tunnel ID 1232 and the downstream L2TP session ID 1233 are set to the values determined above; the multicast session flag 1234 is set to "1", indicating that the session is a multicast L2TP connection.

In step SQ1-16, LAC 1-1 makes an address request under Internet Protocol Control Protocol (IPCP). In step SQ1-17, an IPv4 address is assigned through the multicast L2TP connection. LAC 1-1 handles the assigned IPv4 address as the address of the virtual terminal in the LAC. In step SQ1-18, LAC 1-1 sends an IGMP join message to LNS 2-1 through the multicast L2TP session started earlier. LNS 2-1 recognizes that the virtual terminal having the IP address assigned under IPCP is going to join multicast group G1. In step SQ-20, LAC 1-1 writes the information of each subscriber sending the IGMP join message in the multicast tables 124 to 127 shown in FIG. 8, on the basis of the subscriber information held when the L2TP connection T1 is made. The multicast tables manage destinations to which copied multicast packets are distributed. The tables contain the following information of a terminal sending the IGMP join message: line information (output line interface number), physical port (output port) number, line type, PPPOE session ID, VPI, VCI, and others. A list of distribution destinations of copied packets is uniquely managed in the apparatus by means of a multicast index. A single multicast routing table is managed in a single apparatus. Each of the multicast index tables (126-1 to 126-*n* in FIG. 12 and 127-1 to 127-*n* in FIG. 14) is managed for each protocol processing unit linked to a line interface.

In step SQ1-19, LNS 2-1, which has received an IGMP join message, sends a Protocol Independent Multicast (PIM) join message or the like to the source of multicast packet distribution (rendezvous point or server distributing multicast packets).

When the server distributes multicast packets, the multicast packets are transferred to LNS 2-1 and distributed in accordance with the multicast packet distribution rule of LNS 2-1. Because LNS 2-1 knows that the multicast destinations include the multicast L2TP connection described earlier, the multicast packet is sent through the multicast L2TP connection T3 to LAC 1-1 in step SQ1-21. In step SQ1-22, LAC 1-1 checks the L2TP decapsulation table to see whether the packet sent in this session comes through the multicast L2TP connection used by LAC 1-1 for distribution of copied packets. More specifically, LAC 1-1 searches the L2TP decapsulation table (FIG. 10) for an entry of which LAC address 1231, downstream L2TP tunnel ID 1232, and downstream L2TP session ID 1233 match, using the L2TP tunnel ID and L2TP session ID in the L2TP header and the destination address in the IP1 header of the PK2 format as search keys, and makes a judgment by the multicast session flag 1234. In steps SQ1-23 and SQ1-24, LAC 1-1 obtains the information of multicast destination subscribers from the multicast tables (Output IF and v4 multicast index of the v4 multicast routing table (FIG. 11) and the v4 multicast index table (FIG. 12)) and distributes copies of the multicast packet to the subscribers.

(Adding a Distribution Destination)

Figure 4:
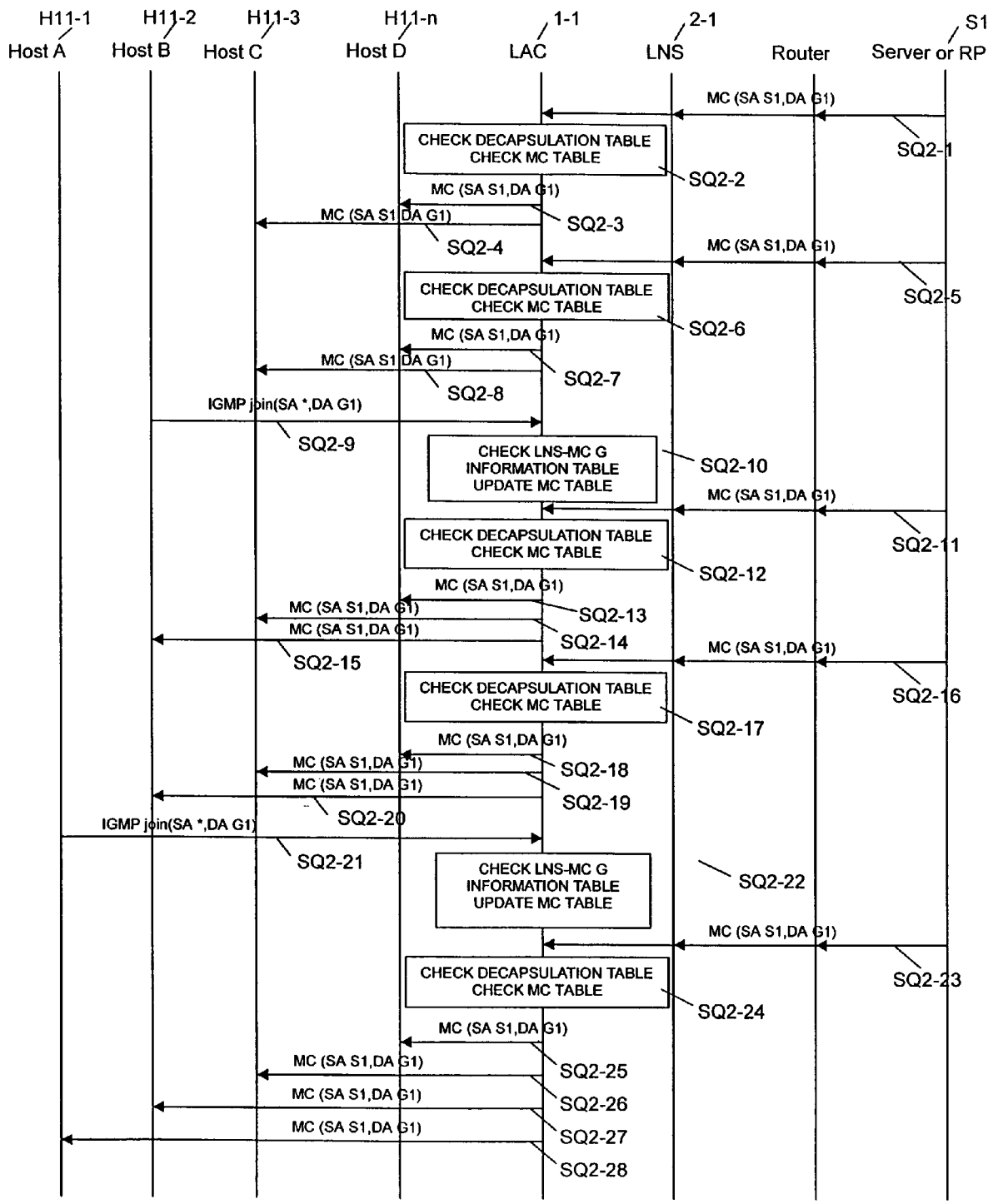
FIG. 4 is a view showing a sequence for adding a subscriber.

FIG. 4 shows a sequence for adding a distribution destination while multicast packet distribution is in progress.

In steps SQ2-1 and SQ2-5, the server sends multicast packets of multicast group G1. Subscriber C (H11-3) receives the multicast packets in steps SQ2-4 and SQ2-8, and subscriber D (H11-*n*) receives the multicast packets in steps SQ2-3 and SQ2-7.

In step SQ2-9, subscriber B (H11-2) sends an IGMP join message to join multicast group G1. LAC 1-1 checks the contents of the IP2 header and data block in the PK3 format to see whether the packet from the subscriber is an IGMP join message. If so, the IGMP packet is terminated without being subjected to L2TP encapsulation. Then, the multicast session started flag 1214 of the LNS-multicast group information table (FIG. 9) is checked to see whether a multicast L2TP connection for multicast group G1 has already been made. In the shown example, it is judged that a multicast L2TP connection for multicast group G1 has already been made and a new L2TP connection is not made. In step SQ2-10, LAC 1-1 updates the multicast tables which manage the subscriber information, by adding subscriber B as a distribution destination of multicast group G1. When the server distributes multicast packets in step SQ2-11, LAC 1-1 forms and distributes the copies of the packets to subscribers D, C, and B in steps SQ2-13, SQ2-14, and SQ2-15 respectively. If subscriber A (H11-1) joins multicast group G1, the multicast tables are updated in the same procedure, and packets are distributed to subscribers D, C, B, and A, as in steps SQ2-25, SQ2-26, SQ2-27, and SQ2-28.

(Deleting a Distribution Destination)

Figure 5:
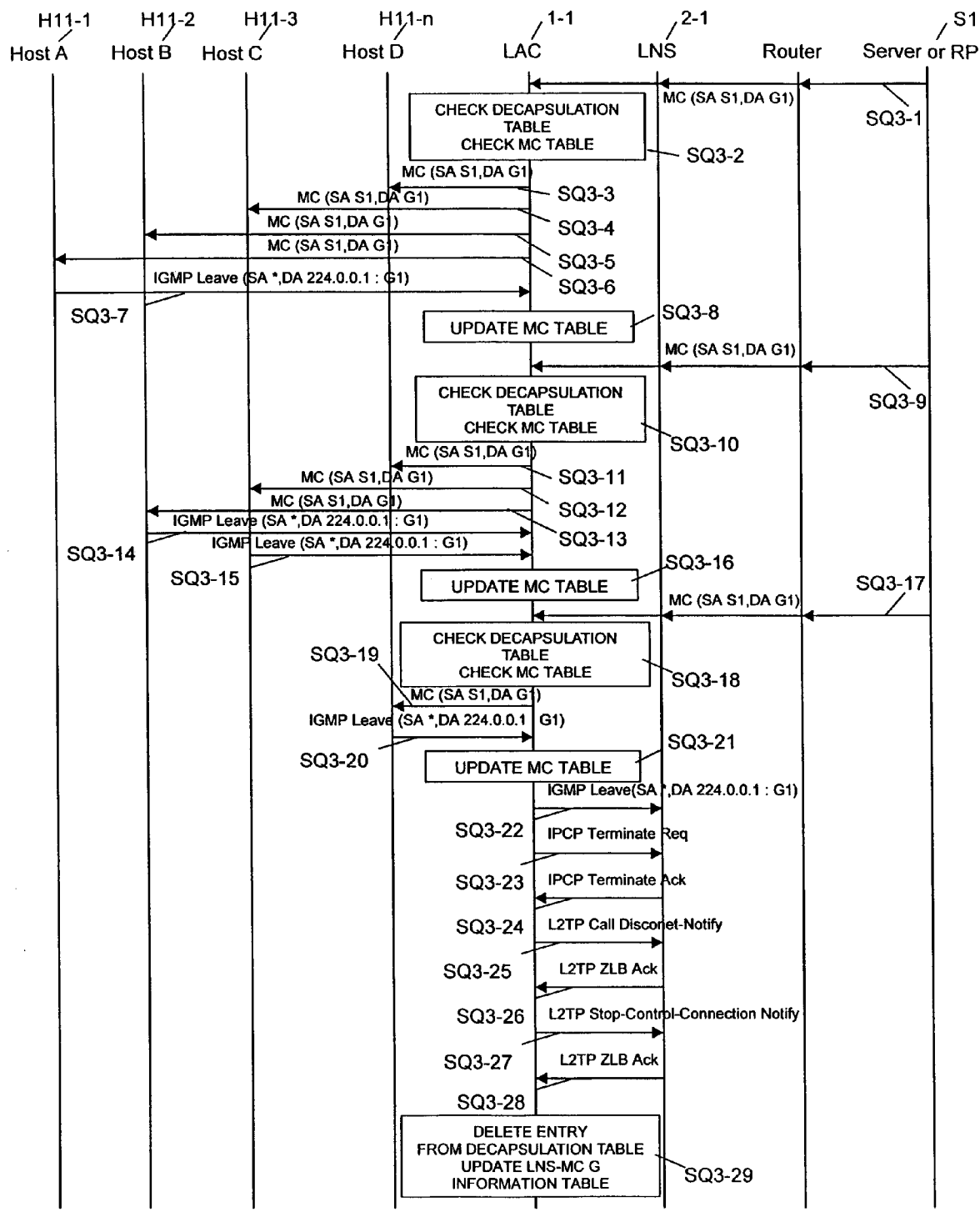
FIG. 5 is a view showing a sequence for deleting a subscriber.

FIG. 5 shows a sequence for deleting a distribution destination while multicast packet distribution is in progress.

The server sends a multicast packet of multicast group G1 in step SQ3-1, and subscribers D (H11-*n*), C (H11-3), B (H11-2), and A (H11-1) receive the multicast packet in steps SQ3-3, SQ3-4, SQ3-5, and SQ3-6 respectively.

In step SQ3-7, subscriber A (H11-1) sends an IGMP leave message in order to leave multicast group G1. LAC 1-1 checks the contents of the IP2 header and data block in the PK3 format to see whether the packet from the subscriber is an IGMP leave message. If so, the IGMP packet is terminated in step SQ3-7 without being subjected to L2TP encapsulation. In step SQ3-8, LAC 1-1 deletes subscriber A from the distribution destinations of multicast group G1 in the multicast tables managing the subscriber information. When the server distributes another multicast packet in step SQ3-9, LAC 1-1 forms and distributes copies of the packet to subscribers D, C, and B in steps SQ3-11, SQ3-12, and SQ3-13 respectively.

If subscribers B and C also leave multicast group G1 in steps SQ3-14 and SQ3-15 respectively, the multicast tables are updated in the same procedure in steps SQ3-16 to SQ3-18. Then, the packet is sent to subscriber D alone in step SQ3-19. If subscriber D (H11-*n*), who is the last distribution destination of multicast group G1, sends an IGMP leave message in step SQ3-20, LAC 1-1 deletes subscriber D from multicast group G1 in the multicast tables and recognizes that there remains no subscriber in multicast group G1 in step SQ3-21. In step SQ3-22, LAC 1-1 sends an IGMP leave message to LNS 2-1 to indicate that the virtual terminal in LAC 2-1 leaves multicast group G1, in order to release the L2TP connection for multicast group G1. In steps SQ3-23 and SQ3-24, the IP address obtained for the virtual terminal is released. In steps SQ3-25 to SQ3-28, the L2TP connection made for multicast packet G1 is released. In step SQ3-29, the information of the multicast L2TP connection is deleted from the L2TP decapsulation table, and the multicast session started flag 1214 of the corresponding entry is set to "0" in the LNS-multicast group information table (FIG. 9).

3. Detailed Flowchart (Making a Connection)

Figure 15:
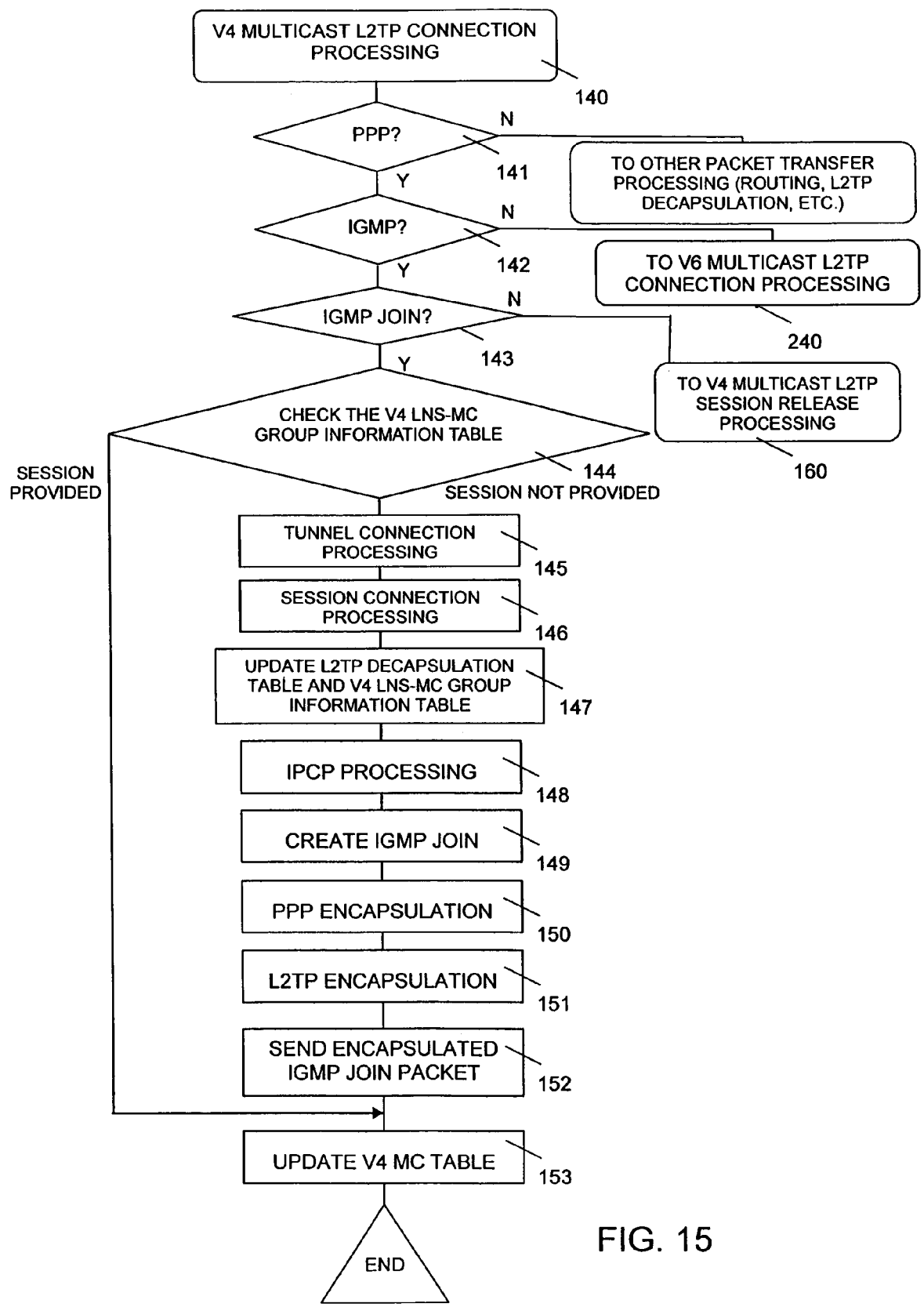
FIG. 15 is a view showing v4 multicast L2TP connection processing.

FIG. 15 shows a flowchart for making a multicast L2TP connection for IPv4 by the present apparatus. This processing corresponds to the processing performed in LAC 1-1 in steps SQ1-4 to SQ1-20 shown in FIG. 3.

When LAC 1-1 receives an IGMP join packet from a subscriber terminal (in step SQ1-4 of FIG. 3), packet information in the reception buffer 102 for line interface is read in the packet transfer apparatus 1 of the present invention. In step 141, the protocol processing processor 101 judges whether the packet is a PPP packet. If so, it is judged that the packet has come from a subscriber, and the contents of the packet are checked in step 142 to see whether the packet is an IGMP packet. If so, it is checked in step 143 whether the packet is an IGMP join message. If so, the v4 LNS-multicast group information table (FIG. 9) is searched through by the multicast group address 1212 and the LNS address 1211 of the LNS to which the subscriber is connected (in step SQ1-6). In step 144, the multicast session started flag 1214 of the LNS-multicast group information table (FIG. 9) is checked to see whether an L2TP session for the group has already started.

If the session has already started (if the multicast session started flag 1214 is set to "1" in the LNS-multicast group information table (FIG. 9)), the processing goes to step 153.

If the session has not started (if the multicast session started flag 1214 is set to "0" in the LNS-multicast group information table (FIG. 9)), the multicast session LNS address 1213 of the LNS to which a multicast L2TP session should be started is obtained from the search result of the v4 LNS-multicast group information table. Then, the protocol processing unit 10-*i* sends the received IGMP join packet and the LNS address to the control unit 40, as a preparation to making an L2TP connection. The control unit 40 terminates the IGMP join packet and performs tunnel connection in step 145 and session connection in step 146 under L2TP (steps SQ1-7 to SQ1-14). After the session starts, the protocol processing processor 101 receives an instruction from the control unit 40 and writes the session information in the v4 LNS-multicast group information table (FIG. 9) and the L2TP decapsulation table (FIG. 10) in step S147 (step SQ1-15). The protocol processing processor 101 writes the upstream L2TP tunnel ID 1215 and the upstream L2TP session ID 1216 in the LNS-multicast group information table (FIG. 9). In the L2TP decapsulation table (FIG. 10), the protocol processing processor 101 creates an entry, specifying the IP address of the LAC terminating the multicast L2TP connection, which is IP-LAC1-1, as the LAC address 1231, setting the downstream L2TP tunnel ID 1232 and the downstream L2TP session ID 1233 to the values determined in the L2TP connection processing, and setting the multicast session flag 1234 to "1".

In step 148, the control unit 40 performs the IPCP processing in order to obtain the IP address of the virtual terminal. After the IPCP processing (steps SQ1-16 and SQ1-17) is completed, the processor of the control unit 40 creates and sends an IGMP join message to the protocol processing processor 101 in step 149. The protocol processing processor 101 performs PPP encapsulation in step 150 and L2TP encapsulation in step 151, and sends the IGMP join packet to LNS 2-1 by the multicast session in step 152 (step SQ1-18).

The control unit 40 gives the protocol processing processor 101 an instruction to write the subscriber information in the v4 multicast routing table 124 and the v4 multicast index table 126. The protocol processing processor 101 updates the v4 multicast tables accordingly in step 153 (step SQ1-20).

Figure 17:
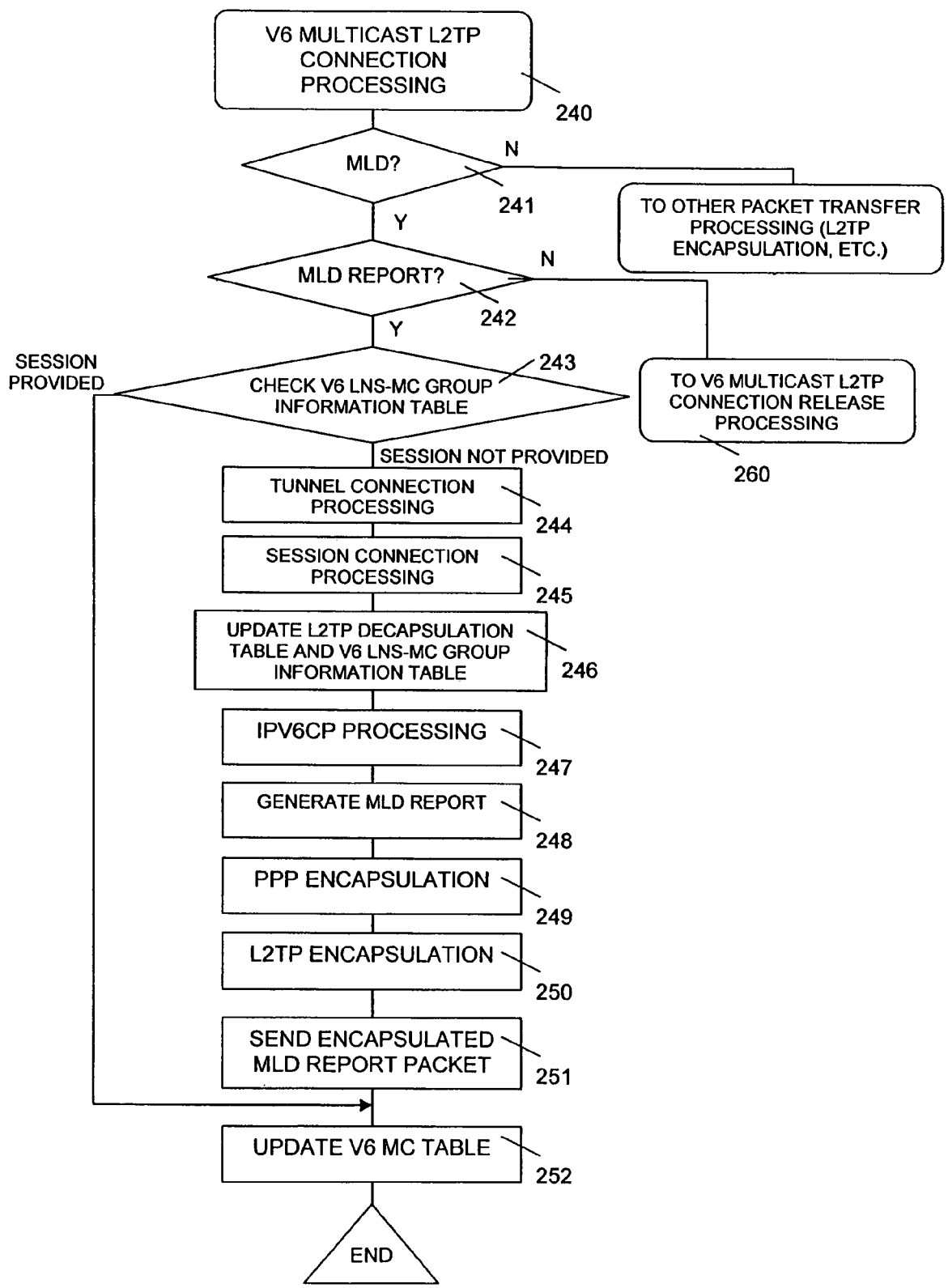
FIG. 17 is a view showing v6 multicast L2TP connection processing.

FIG. 17 shows a flowchart for making a multicast L2TP connection for IPv6 by the present apparatus.

The IPv6 multicast session processing differs from the IPv4 multicast session processing only in that MLD snooping is performed in steps 241, 242, 248, and 251, instead of IGMP snooping; IPv6CP processing is performed in step 247, instead of IPCP processing; v6 multicast tables are used in step 252, instead of the v4 multicast tables; and the v6 LNS-multicast group information table is used in steps 243 and 246, instead of the v4 LNS-multicast group information table.

(Packet Distribution)

Figure 19:
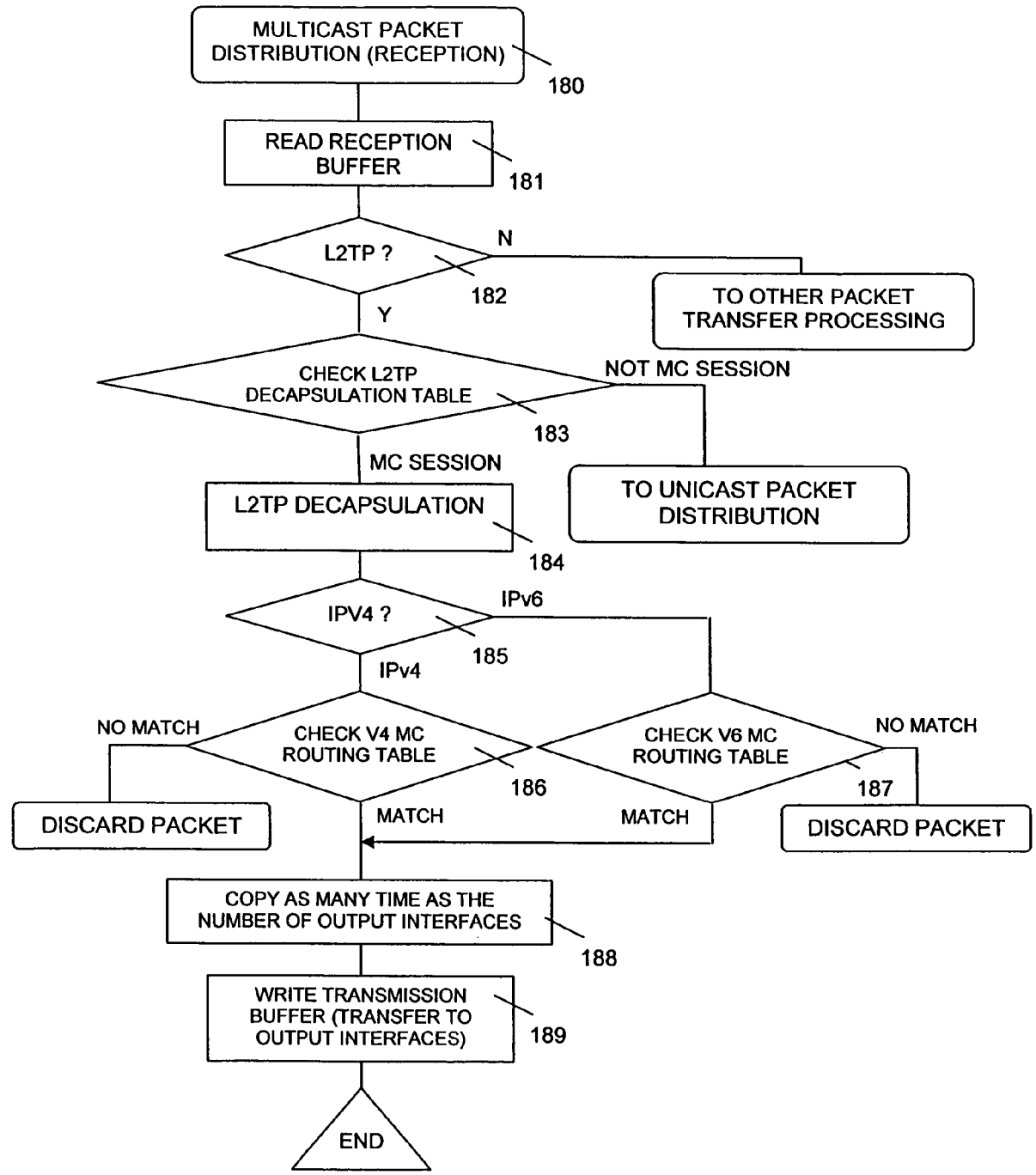
FIG. 19 is a view showing reception processing performed by the protocol processing unit, as a part of multicast packet distribution.

FIG. 19 shows a flowchart of reception processing performed by the present apparatus as a part of multicast packet distribution.

The reception processing is performed in the present apparatus as illustrated in FIG. 3, between when a multicast packet is received from a server through a multicast L2TP session (step SQ1-21, for instance) and when copies of the multicast packet are formed and distributed to the subscribers (SQ1-23 and SQ1-24, for instance).

When a packet reaches the protocol processing unit 10-*i* through an input line 60-*i* and a line interface 30-*i*, the protocol processing processor 101 reads the packet from the reception buffer 102 in step 181. The contents of the packet are checked in step 182 to see whether the packet is an L2TP packet. If so, the multicast session flag 1234 of the L2TP decapsulation table (FIG. 10) is checked in step 188 to see whether the packet is received in a multicast L2TP session. In this step, the address 1231 of the LAC terminating the multicast connection, the downstream L2TP tunnel ID 1232, and the downstream L2TP session ID 1233 obtained from the packet are used as search keys.

If the packet is from a multicast session, the protocol processing processor 101 performs L2TP decapsulation (113 in FIG. 8) in step 184 and checks the version of the IP header after decapsulation in step 185 to see whether the packet is an IPv4 packet or an IPv6 packet.

If the packet is an IPv4 packet, the processing goes to step 186. The v4 multicast routing table (FIG. 11) is searched (111 in FIG. 8) by the LNS address 1241 of the LNS to which the multicast L2TP session is formed and the destination address 1242 of the multicast group, and the output interface 1243 of the multicast packet and the v4 multicast index 1244 are obtained.

If the packet is an IPv6 packet, the processing goes to step 187. The v6 multicast routing table (FIG. 13) is searched (111 in FIG. 8) by the LNS address 1251 and the destination address 1252 of the multicast group, and the output interface 1253 of the multicast packet and the v6 multicast index 1254 are obtained. The protocol processing unit to which the output line interface is connected requires the v4/v6 multicast index, in order to obtain an output port and output header.

After the information of the output line interface is obtained, the packet is copied as many times as the number of output line interfaces in step 188 (packet copy processing 114 in FIG. 8). The copied packets are transferred through the internal switch to the output line interfaces in step 189.

Figure 20:
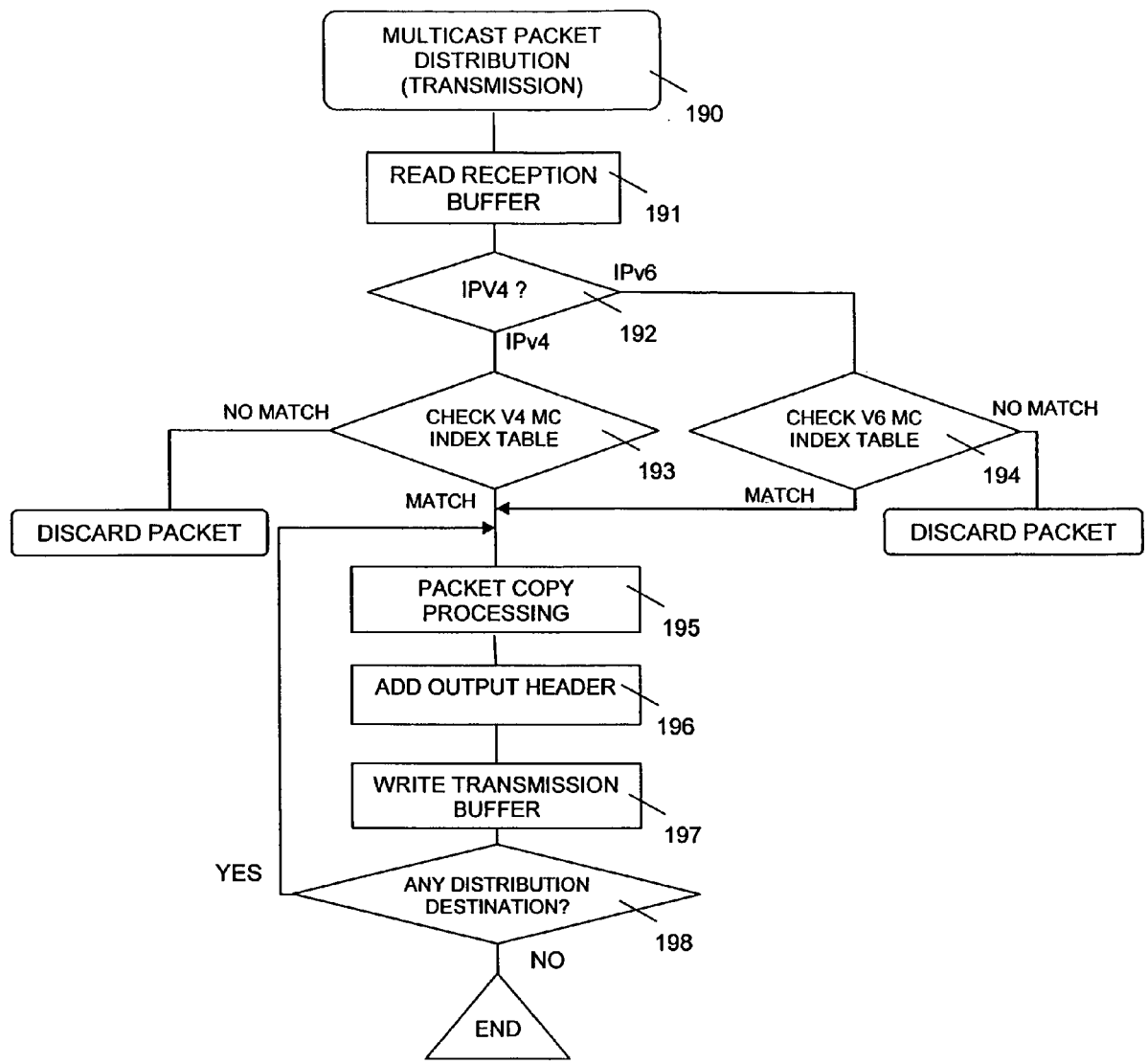
FIG. 20 is a view showing transmission processing performed by the protocol processing unit, as a part of multicast packet distribution.

FIG. 20 shows a flowchart of transmission processing performed by the present apparatus as a part of multicast packet distribution.

The transmission processing is performed in the present apparatus as illustrated in FIG. 3, between when a multicast packet is received from a server through a multicast L2TP session (step SQ1-21, for instance) and when copies of the multicast packet are formed and distributed to the subscribers (SQ1-23 and SQ1-24, for instance).

In step 191, the protocol processing processor 101 of the protocol processing unit 10-*i* linked to each output line interface reads a packet from the reception buffer 104 on the switch side. In step 192, the IP version of the packet is checked to see whether the packet is an IPv4 packet or an IPv6 packet.

If the packet is an IPv4 packet, the IPv4 multicast index table (FIG. 12) held for the line interface is searched through by the IPv4 multicast index 1261, and the following output port information is obtained from the search result: line type 1262 of the subscriber to which the packet is sent, PPoE session ID 1262, if the line type is PPPoE or PPPoEoA, or VP 1264 and VC 1265 of ATM, if the line type is PPPoA, and output port number 1266. In step 195, the packet is copied as many times as the number of subscribers (packet copy processing 114 in FIG. 8). In step 196, an output header (header of a lower layer) is added on the basis of the search result obtained above (output header addition processing 115 in FIG. 8). In step 197, the transmission buffer 105 is written. In step 198, the sequence of steps 195 to 197 (steps SQ1-23 and SQ1-24, for instance) is repeated for each subscriber belonging to the multicast group (packet copy processing 114 in FIG. 8).

If the packet is an IPv6 packet, the IPv6 multicast index table (FIG. 14) is searched through by the IPv6 multicast index 1271 in step 194, and the subsequent processing is performed in the same way as for an IPv4 packet.

(Adding a Distribution Destination)

The processing to add a subscriber while multicast distribution to subscribers is in progress is described with reference to FIG. 15.

If an IGMP join packet is received from a subscriber terminal (step SQ2-9 in FIG. 4), the protocol processing processor 101 of the protocol processing unit 10-*i* reads the packet information from the reception buffer 102 for line interface and determines in step 141 whether the packet is a PPP packet. If so, it is judged that the packet is sent from a subscriber, and the contents of the packet are checked in step 142 to see whether the packet is an IGMP packet. If so, it is checked in step 143 whether the packet is an IGMP join message. If so, the v4 LNS-multicast group information table (FIG. 9) is searched by the multicast group address 1212 and LNS address 1211 written in the IGMP packet, and the corresponding multicast session started flag 1214 is checked to see whether an L2TP session of the group has already started for the group. If the v4 LNS-multicast group information table is as shown in FIG. 9, the session has already started (the multicast session started flag 1214 is set to "1"). Accordingly, the control unit 40 is informed that an IGMP join packet is present and that a multicast session has already started. The control unit 40 terminates the IGMP join packet (subscriber IGMP termination 414 in FIG. 7) and gives the protocol processing processor 101 an instruction to add the information of the subscriber sending the IGMP join message to the v4 multicast routing table 124 and the v4 multicast index table 126. The protocol processing processor 101 updates the v4 multicast tables accordingly in step 153.

If the packet is an IPv6 packet, the processing to be performed differs from the processing described above just in that IGMP is replaced by MLD, IPCP is replaced by IPv6CP, and the v4 multicast routing table 124 and the v4 multicast index table 126 are replaced respectively by the v6 multicast routing table 125 and the v6 multicast index table 127.

(Leaving a Group)

Figure 16:
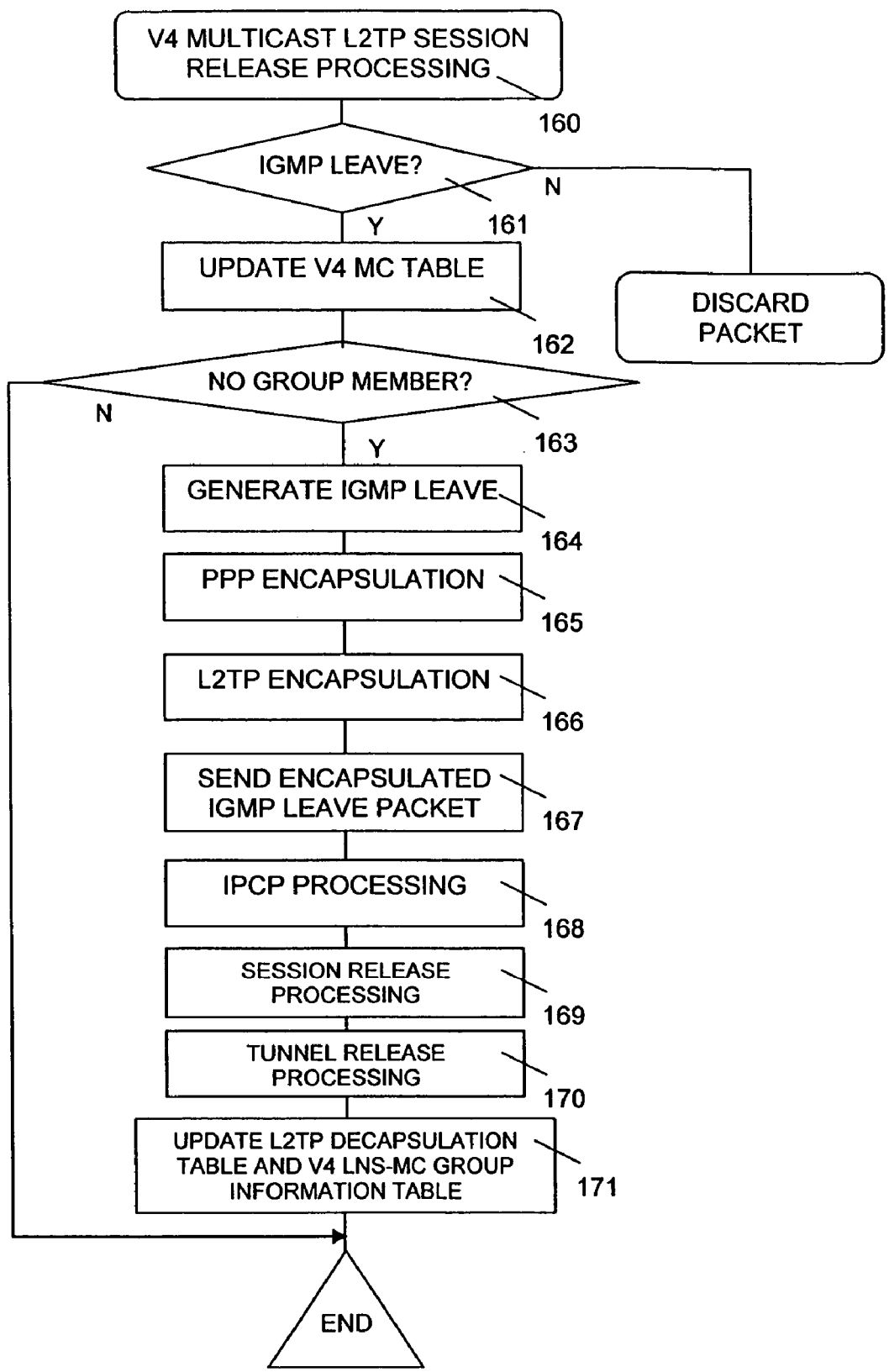
FIG. 16 is a view showing v4 multicast L2TP connection release processing.

FIG. 16 shows a flowchart for releasing a v4 multicast L2TP connection.

If a subscriber wants to leave a multicast group while multicast distribution to subscribers is in progress, as in steps SQ3-15 and SQ3-20 of FIG. 5, the procedure illustrated in FIG. 15 and FIG. 16 is followed.

If an IGMP leave message is received in step SQ3-15, it is determined in step 143 of FIG. 15 that the message is not an IGMP join message. Then, the processing goes to the v4 multicast session release processing of step 160 (FIG. 16). In step 161, the protocol processing processor 101 checks whether the packet is an IGMP leave message. If so, the protocol processing processor 101 deletes the information of subscriber C from both the v4 multicast routing table 124 and the v4 multicast index table 126 in step 162. In step 163, the v4 multicast tables are checked to see whether there is a subscriber belonging to multicast group G1. In the example of step SQ3-15, subscriber D is still belonging to the group, and the deletion processing ends here.

If an IGMP leave message is received in step SQ3-20, it is determined in step 143 of FIG. 15 that the message is not an IGMP join message. Then, the processing goes to the v4 multicast session release processing of step 160 (FIG. 16). In step 161, the protocol processing processor 101 checks whether the packet is an IGMP leave message. If so, the protocol processing processor 101 deletes the information of subscriber D from both the v4 multicast routing table 124 and the v4 multicast index table 126 in step 162. In step 163, the v4 multicast tables are checked to see whether there is a subscriber belonging to multicast group G1.

In this example, the group has no subscribers. The protocol processing processor 101 informs the control unit 40 that an IGMP leave packet is received and that there are no subscribers. The control processor 401 terminates the IGMP leave message, and creates and transfers another IGMP leave message to the protocol processing unit 10 in step 164. The protocol processing processor 101 performs PPP encapsulation in step 165 and L2TP encapsulation in step 166, and sends the packet to the LNS in step 167 (step SQ3-22). In step 168, the control unit 40 performs IPCP processing and releases the IP address of the virtual terminal (steps SQ3-23 and SQ3-24). The control unit 40 performs L2TP session release processing in step 169 (steps SQ3-25 and SQ3-26) and L2TP tunnel release processing in step 170 (steps SQ3-27 and SQ3-28). Now, the multicast L2TP connection is released. Then, the control processor 401 gives the protocol processing unit 10 an instruction to delete the information of the released session from both the v4 LNS-multicast group information table (FIG. 9) and the L2TP decapsulation table (FIG. 10). In step 171, the protocol processing processor 101 updates the v4 LNS-multicast group information table and the L2TP decapsulation table accordingly.

Figure 18:
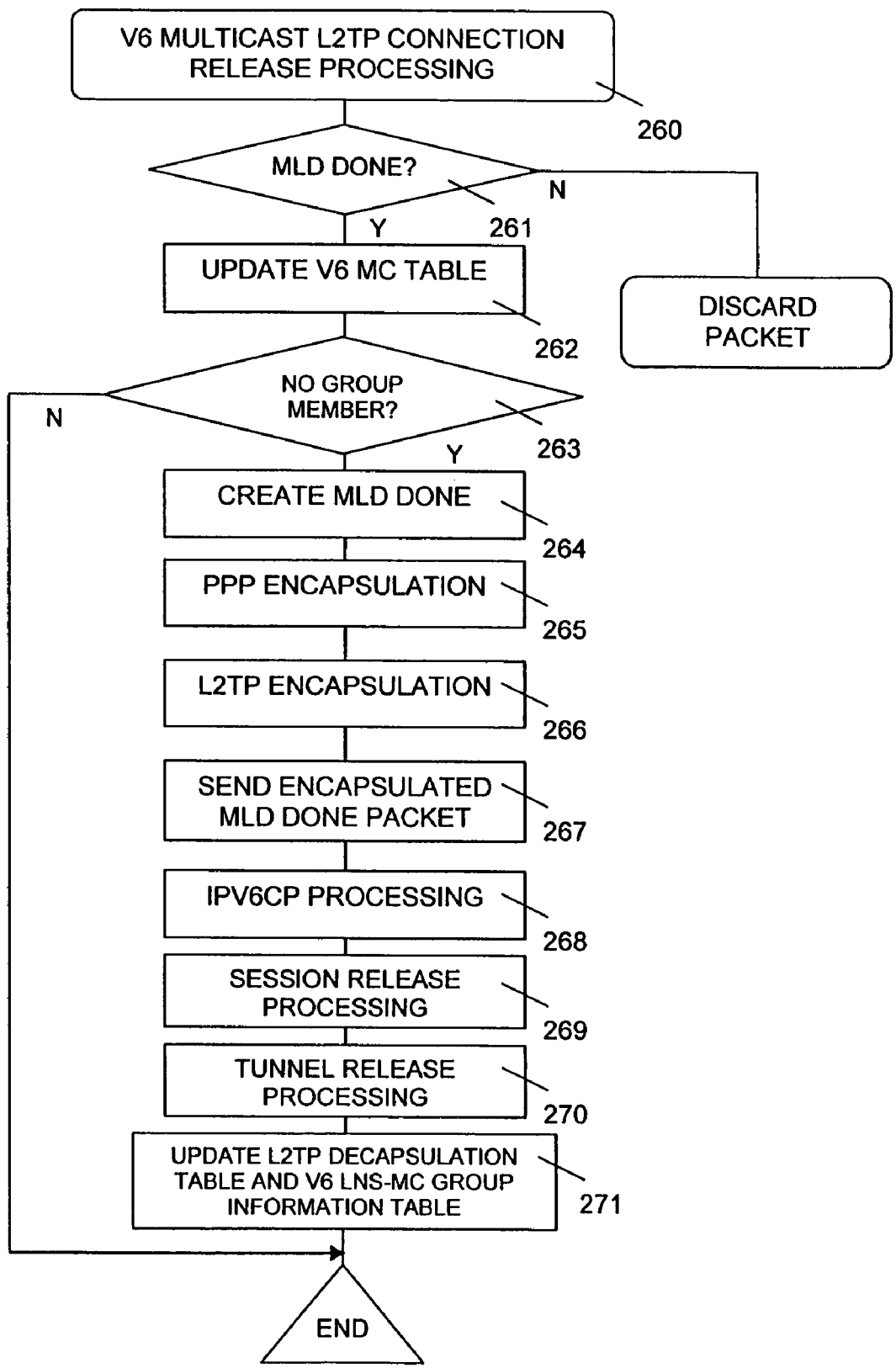
FIG. 18 is a view showing v6 multicast L2TP connection release processing.

FIG. 18 shows a flowchart for releasing a v6 multicast L2TP connection. The figure shows the procedure for IPv6, which is the same as for IPv4 and will not be described in detail.

4. System in which Multiple LNSs are Connected to a Single LAC (Multicasting)

Figure 21:
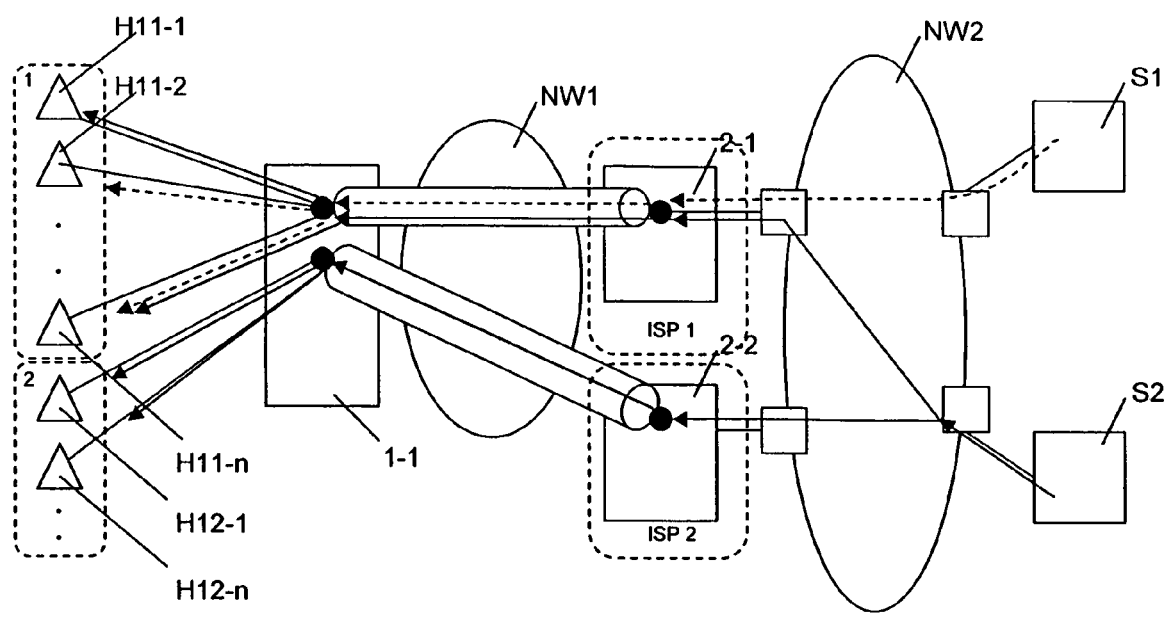
FIG. 21 is a view showing a configuration of a network where the LNSs of a plurality of ISPs are connected to a single LAC.

FIG. 21 shows a configuration of a network where the LNSs of a plurality of ISPs are connected to a single LAC, using the packet transfer apparatus of the present invention.

Figure 22:
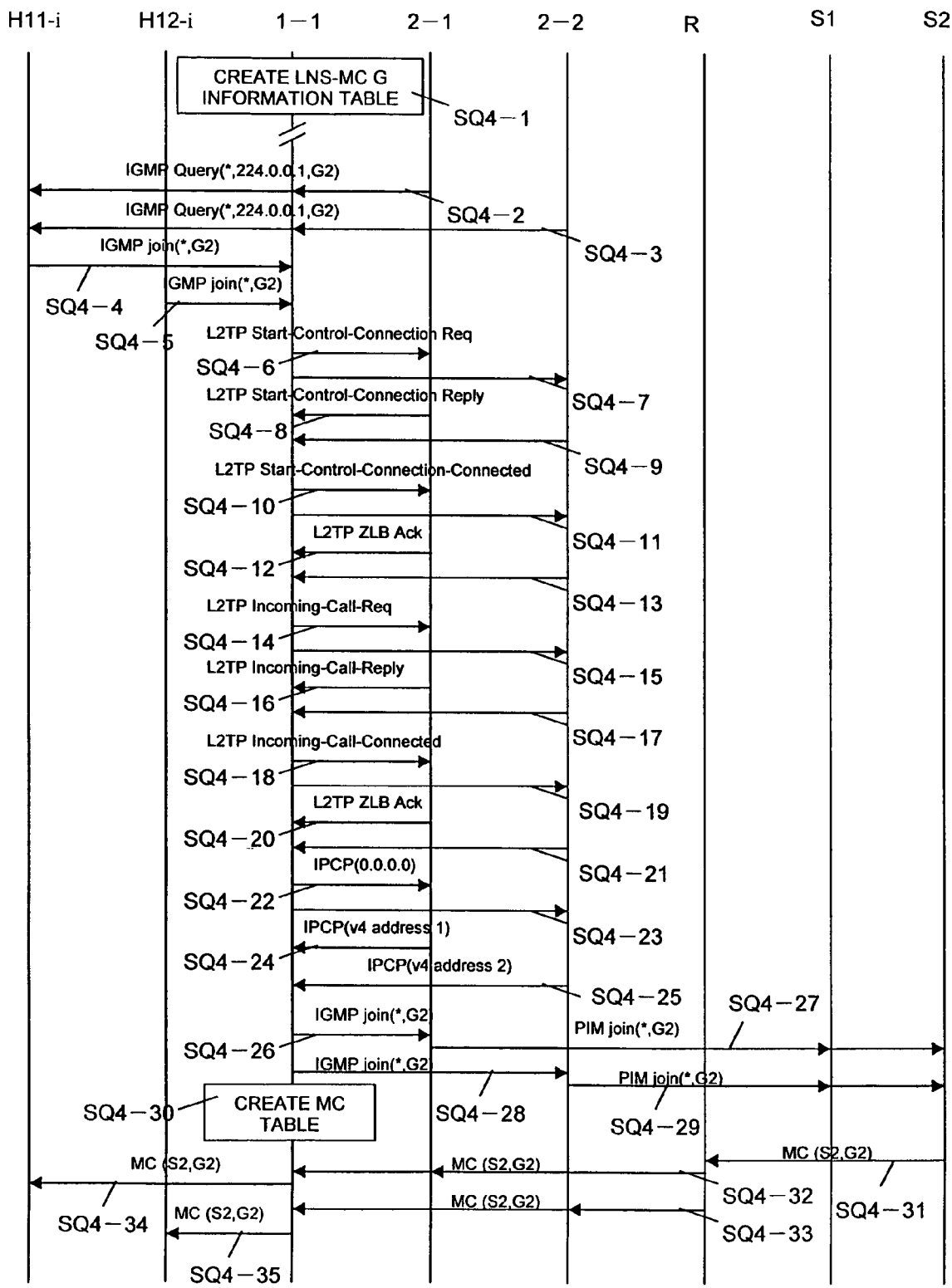
FIG. 22 is a view showing an example sequence until a subscriber receives a multicast packet, in a network where the LNSs of a plurality of ISPs are connected to a single LAC.

FIG. 22 shows an example connection sequence in the network shown in FIG. 21, assuming that the L2TP connection for multicast group G1 has already been made. The sequence shown in FIG. 22 is for making a new connection for multicast group G2. In the LNS-multicast group information table (FIG. 9), the-same value is specified as the LNS address 1211 of the LNS which subscribers are belonging to and the multicast session LNS address 1213 to which a multicast L2TP connection is made, in step SQ4-1. If the LNS is of ISP 2, the address of LNS 2-2 is specified in the two LNS address fields 1211 and 1213. If the multicast group address 1212 is set to "Don't Care" (D.C), a session with an LNS having the LNS address 1213 is established for all multicast groups.

If LAC 1-1 receives IGMP join packets from subscribers (in steps SQ4-4 and SQ4-5), LAC 1-1 performs L2TP connection processing on the basis of the information of the LNS-multicast group information table (in steps SQ4-6 to SQ4-26 and SQ4-28): An L2TP connection related to subscriber H11-$i$ and multicast group G2 is made to LNS 2-1; and an L2TP connection related to subscriber H12-$i$ and multicast group G2 is made to LNS 2-2. The L2TP connection sequence is performed in the same way as illustrated in FIG. 3. Then, the information of subscribers H11-$i$ and H12-$i$ is written in the multicast tables.

If the multicast group address 1212 is set to "Don't Care" in the LNS-multicast group information table, an entry of the LNS-multicast group information table is created after a session with a multicast group is established, and the information of the multicast group is written. If an L2TP session related to the LNS of ISP 2 and multicast group G2 is established, for instance, a new entry is added to the LNS-multicast group information table (FIG. 9). In the new entry, the LNS address 1211 is set to the address of LNS 2-2 of ISP 2, the multicast group address 1212 is set to G2, the multicast session LNS address 1213 is set to the address of LNS 2-2, the multicast session started flag 1214 is set to a value indicating that the session has started ("ON", for instance), the upstream L2TP tunnel ID 1215 and the upstream L2TP session ID 1216 are set to the corresponding values of the L2TP connection made for multicast group G2.

Then, multicast packets are distributed as illustrated in FIG. 21.

(Concentration)

Figure 23:
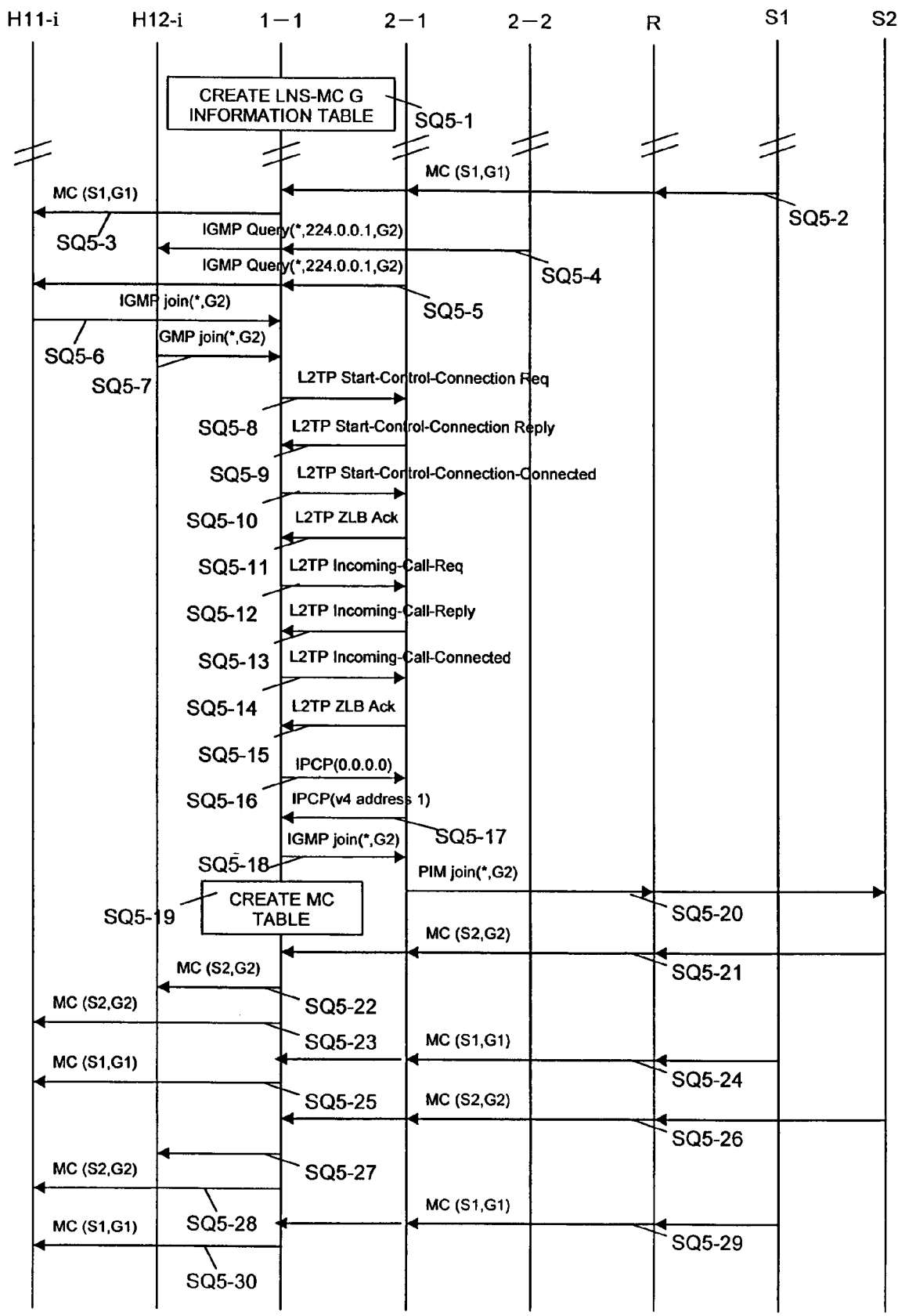
FIG. 23 is a view showing an example sequence for consolidating multicast L2TP sessions.
Figure 24:
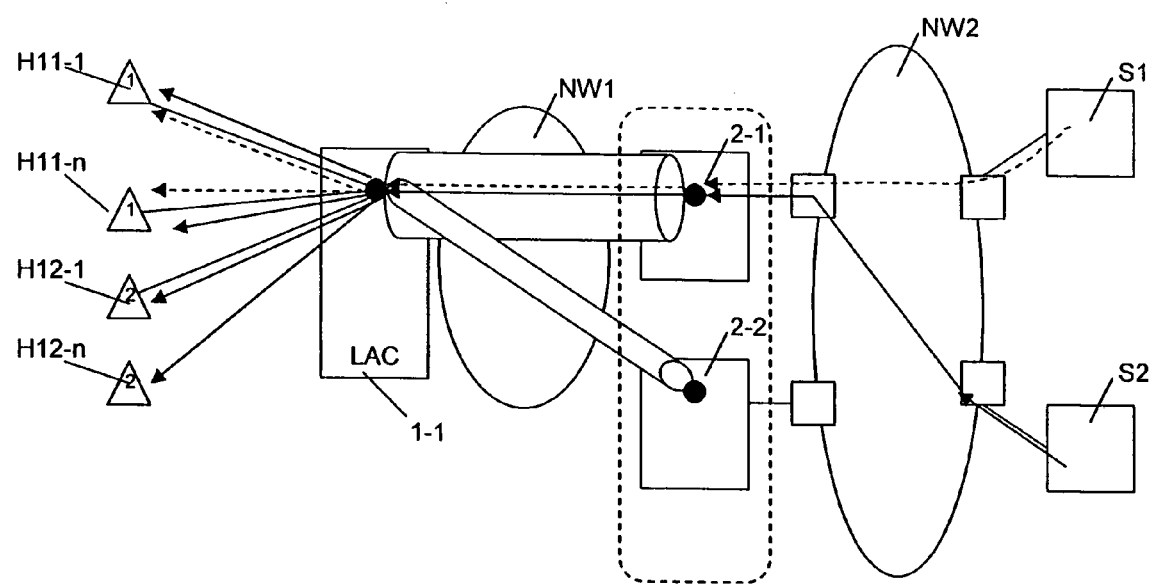
FIG. 24 is a view showing an example of consolidating multicast L2TP sessions.
Figure 25:
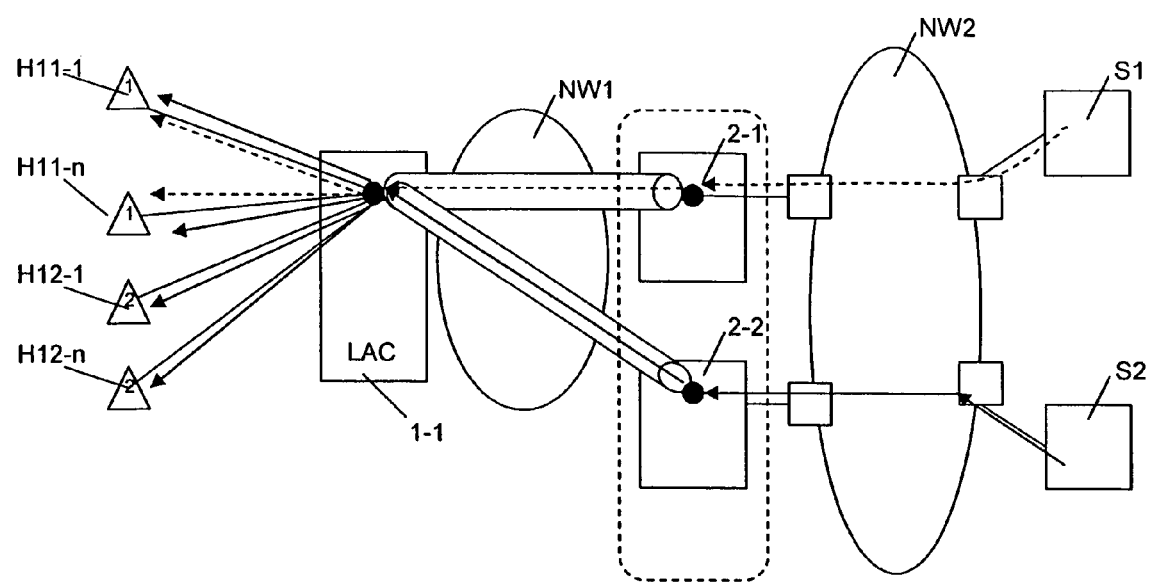
FIG. 25 is a view showing an example of distributing the load on a line in a multicast L2TP session.

FIG. 23 shows a sequence for concentrating multicast packets of a plurality of LNSs belonging to a single ISP. FIG. 24 illustrates an example of concentrating multicast L2TP sessions. FIG. 25 shows an example of distributing the load on a line in a multicast L2TP session.

Subscriber H11-$i$ (i=1 to n) is connected to network NW2 through LAC 1-1 and an L2TP connection made to LNS 2-1. Subscriber H12-$i$ (i=1 to n) is connected to network NW2 through LAC 1-1 and an L2TP connection made to LNS 2-2. LNS 2-1 and LNS 2-2 are managed by a single ISP. Multicast groups G1 and G2 are provided. Multicast packets of G1 can be received just through LNS 2-1, and multicast packets of G2 can be received through both LNS 2-1 and LNS 2-2. In step SQ5-1, the LNS-multicast group information table is specified to distribute the packets of multicast group G1 through LNS 2-1. As for multicast group G2, two multicast L2TP sessions are established through LNS 2-1 and LNS 2-2. Because LNS 2-1 and LNS 2-2 belong to the same ISP, the two sessions can be consolidated to a single multicast L2TP session.

To consolidate the two sessions, the information to terminate the session of G2 multicast packets of LNS 2-2 at LNS 2-1 is written in the LNS-multicast group information table (FIG. 9) in step SQ5-1: the LNS address 1211 is set to the address of LNS 2-2, the multicast group address 1212 is set to G2, and the multicast session LNS address 1213 is set to the address of LNS 2-1. It is assumed that LNS 2-1 is set as the termination destination of the session of G2 multicast packets of LNS 2-1. This type of information can be manually specified by the operator or can be automatically specified under appropriate conditions.

In steps SQ5-4 and SQ5-5, LNS 2-2 and LNS 2-1 send an IGMP or MLD packet to check whether a subscriber wants to join multicast group G2 through the L2TP tunnel and L2TP session which have already been provided for the subscriber. If subscribers H11-$i$ and H12-$i$ make a request to join multicast group G2 in steps SQ5-6 and SQ5-7, LAC 1-1 makes an L2TP connection for G2 to LNS 2-1, in accordance with the LNS-multicast group information table, in steps SQ5-8 to SQ5-18. In step SQ5-19, a new entry is created in the multicast routing table, and subscriber H11-$i$ and subscriber H12-$i$, who initially belongs to LNS 2-2, are specified as distribution destinations of the packets of group G2 received from LNS 2-1.

As a result, subscriber H12-$i$ receives multicast packets of group G2 through LNS 2-1 in steps SQ5-22 and SQ5-27. Because subscribers belonging to LNS 2-2 can receive packets of group G2 through LNS 2-1, the L2TP sessions are consolidated (FIG. 24).

If there are a plurality of multicast groups, the load on a line can be distributed as shown in FIG. 25, by specifying different LNSs as termination destinations of a consolidated L2TP session in the LNS-multicast group information table.

(Fault)

Figure 26:
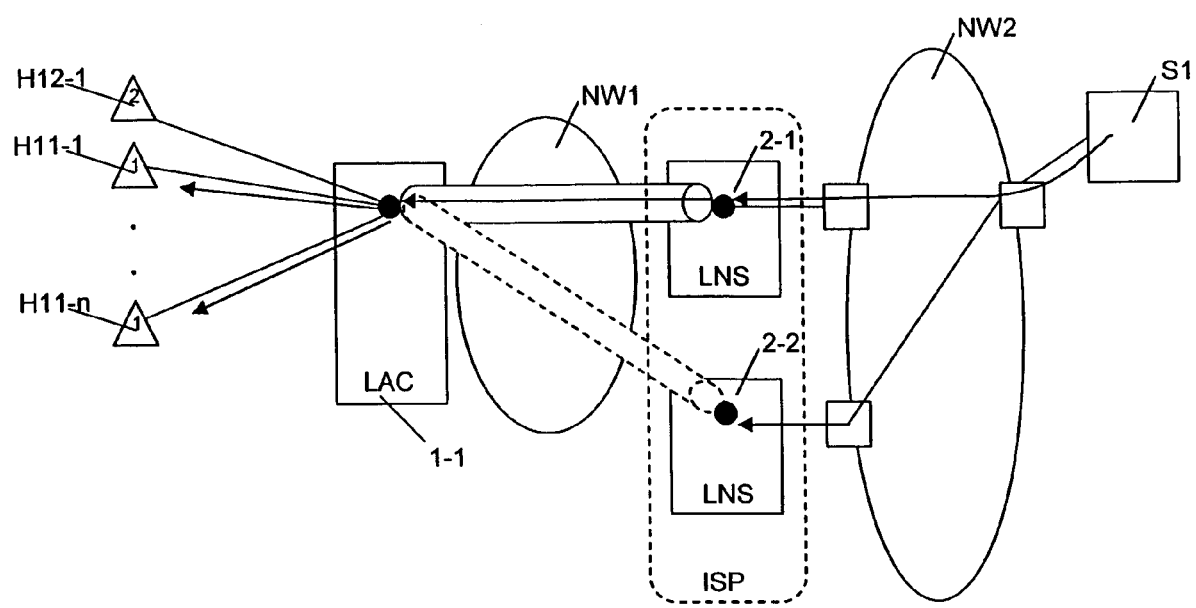
FIG. 26 is a view showing a state before a redundant multicast L2TP session is provided.
Figure 27:
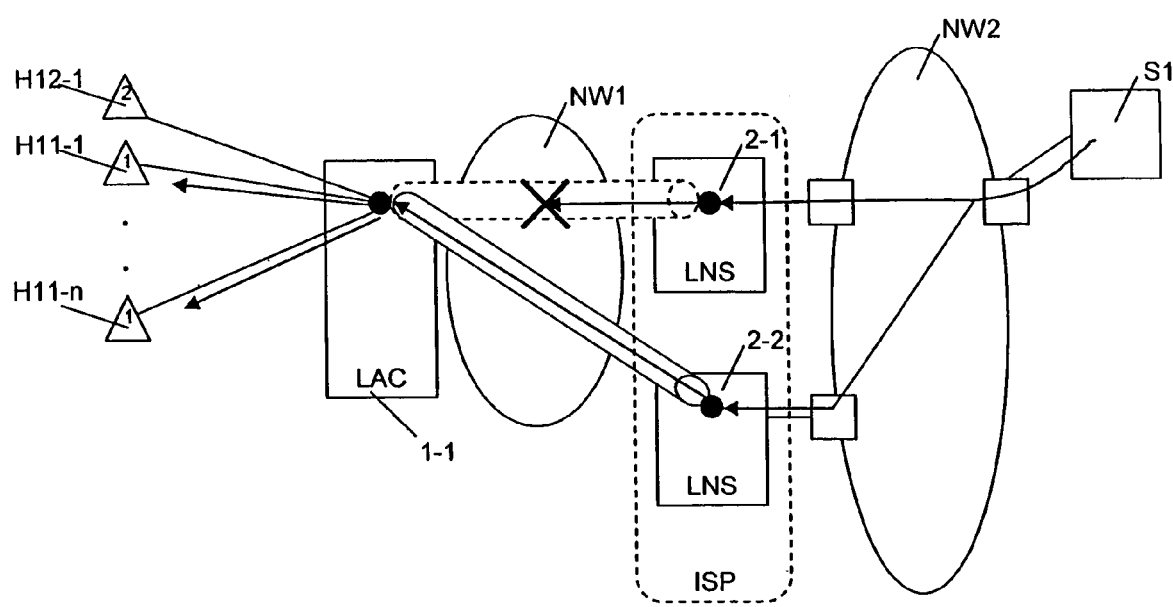
FIG. 27 is a view showing a state after a redundant multicast L2TP session is formed.
Figure 28:
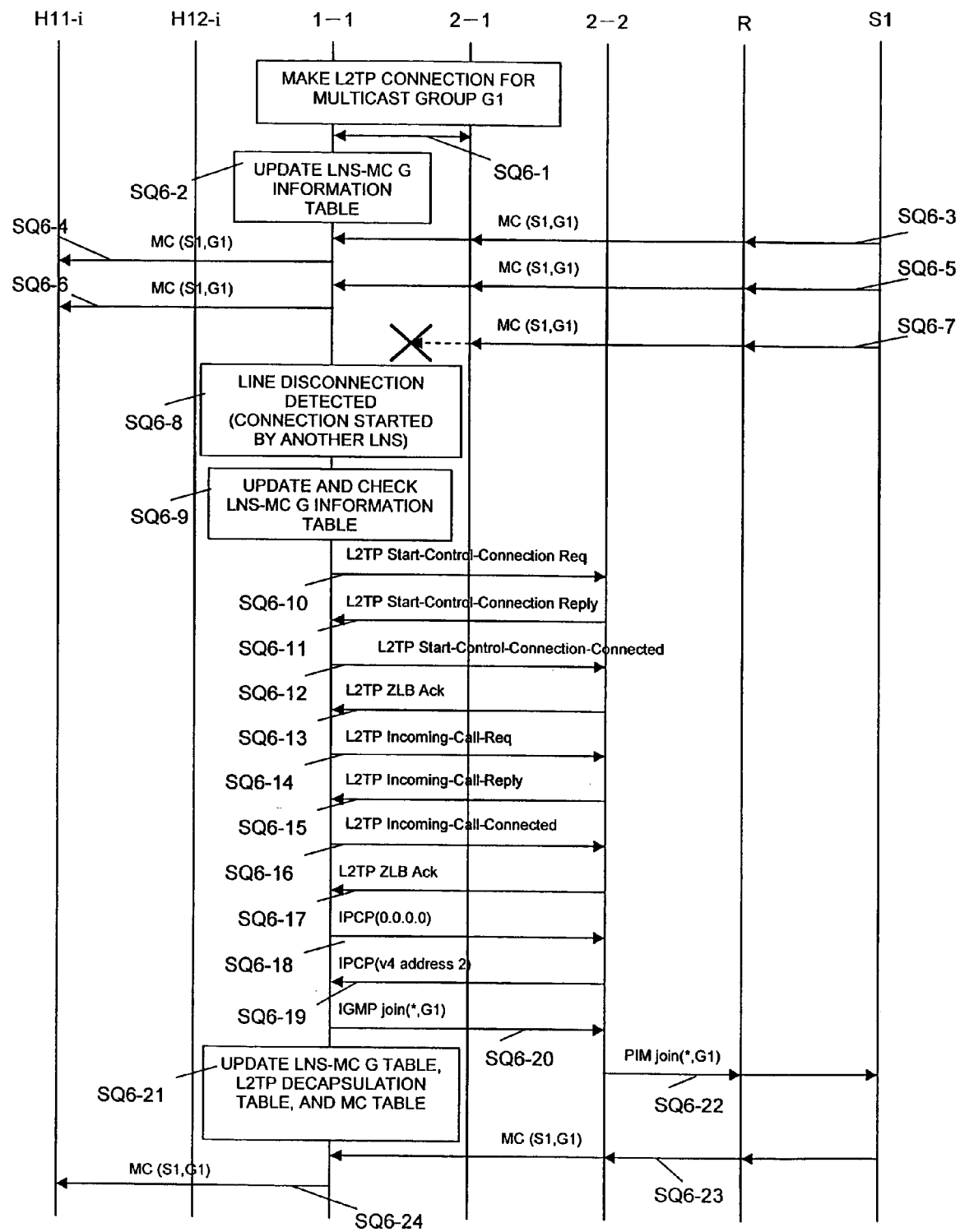
FIG. 28 is a view showing a sequence for forming a redundant multicast L2TP session.

A redundant multicast L2TP tunnel and a redundant multiple L2TP session can be implemented between LAC and LNS, using the packet transfer apparatus of the present invention, as shown in FIG. 26, FIG. 27, and FIG. 28.

FIG. 26 illustrates a state before a line fault occurs. FIG. 27 shows a state after a redundant multicast L2TP session is formed. FIG. 28 shows a sequence for forming a redundant multicast L2TP session.

It is assumed that subscriber H11-$i$ of LNS 2-1 receives a multicast packet of multicast group G1 from multicast server S1 through LNS 2-1. It is also assumed that LNS 2-2 can receive multicast packets of multicast group G1 and that subscriber H12-$i$ of LNS 2-2 does not belong to multicast group G1.

In the sequence shown in FIG. 28, an L2TP connection for multicast group G1 is established between LNS 2-1 and LAC 1-1 in step SQ6-1. In step SQ6-2, the LNS-multicast group information table (FIG. 9) is updated to indicate that an L2TP tunnel and an L2TP session for multicast group G1 can also be formed between LAC 1-1 and LNS 2-2. In the LNS-multicast group information table (FIG. 9), the LNS address 1211 is set to the address of LNS 2-1, the multicast group address 1212 is set to G1, the multicast session LNS address 1213 is set to the address of LNS 2-2, and the multicast session started flag 1214 is set to "0", which indicates that the session has not yet started.

LAC 1-1 has a line fault detection means. A fault occurs in the line of a multicast L2TP session between LAC 1-1 and LNS 2-1 in step SQ6-7, and it is detected in step SQ6-8 that the L2TP connection is disconnected. LAC 1-1 deletes the information of the discontinued L2TP session for group G1 from the LNS-multicast group information table in step SQ6-9. LAC 1-1 searches through the LNS-multicast group information table by the address of LNS 2-1 and G1, finds that an L2TP tunnel and L2TP session for group G1 can be established to LNS 2-2, and starts the processing to establish an L2TP tunnel and L2TP session for group G1 to LNS 2-2 in steps SQ6-10 to SQ6-20. The subsequent operation is the same as the multicast session processing and multicast packet distribution processing described earlier. Then, a redundant configuration is formed with two LNSs (FIG. 27).

A redundant configuration using two LNSs has been described above. A redundant configuration can be formed with two or more LNSs by adding the information of the multiple LNSs and priorities for making a multicast L2TP connection to the LNS-multicast group information table. A redundant configuration using a plurality of physical ports can be formed for a single LNS, by adding the information of the physical ports to the LNS-multicast group information table.

What is claimed is:

1. A packet transfer apparatus for terminating Layer 2 Tunneling Protocol (L2TP), disposed on a subscriber side of a network in which an L2TP tunnel and an L2TP session are formed, the packet transfer apparatus comprising:

an LNS-multicast group information table for storing an L2TP network server (LNS) address to which a multicast L2TP connection is made, an L2TP connection established flag, an upstream L2TP tunnel identifier, and an upstream L2TP session identifier, for the address of an LNS which a subscriber terminal belongs to and the address of a multicast group;

an L2TP decapsulation table for storing a multicast session flag, which indicates whether a multicast L2TP connection is made, for an LAC address, a downstream L2TP tunnel identifier, and a downstream L2TP session identifier;

a multicast table for storing line information including the information of an output port and an output interface to which copies of multicast packets are distributed, for a multicast LNS address and a multicast group address; and a protocol processing unit which can access each of the tables and is connected to a network through an interface, the protocol processing unit comprising:

a means for receiving a packet of a multicast reception request message sent to join a multicast group, by a subscriber terminal which wants to receive a multicast packet, the packet including the address of an LNS which the subscriber terminal belongs to and the address of the multicast group, a means for checking a header and a data block of the packet sent from the subscriber terminal to see whether the packet includes a multicast reception request message, and, if the multicast reception request message is included, for terminating the received packet without performing L2TP encapsulation, a means for checking the L2TP connection established flag related to the received LNS address and multicast group address in the LNS-multicast group information table to see whether an L2TP connection for the multicast group has already been made, a means for adding line information including the information of the output port and the output interface of the subscriber terminal sending a multicast reception request message, to the multicast table, corresponding to the LNS address and multicast group address, if an L2TP connection has already been made, a means for receiving a multicast packet from a server, for searching through the L2TP decapsulation table by an L2TP tunnel identifier, an L2TP session identifier, and a destination address in the header, and for checking the multicast session flag to see whether the distributed packet is a multicast packet received through a multicast L2TP connection, and a means for performing L2TP decapsulation, for searching the multicast table for line information including the information of the output port and the output interface of a destination subscriber terminal, in accordance with the LNS address and multicast group address, and for making and distributing copies of the multicast packet to the subscriber terminals corresponding to the line information, if the packet is determined to be a multicast packet.

2. A packet transfer apparatus according to claim 1, further comprising:

a means for referencing the LNS-multicast group information table to perform L2TP connection processing for multicast packet to an LNS address to which a multicast L2TP connection is made for the received LNS address, for setting an upstream L2TP tunnel identifier, an upstream L2TP session identifier, and an L2TP connection established flag in the LNS-multicast group information table, and for setting a downstream L2TP tunnel identifier, an L2TP session identifier, and a multicast session flag for the LAC address in the L2TP decapsulation table, if it is determined that an L2TP connection is made, and a means for encapsulating and sending the multicast reception request message through a multicast L2TP session to an LNS.

3. A packet transfer apparatus according to claim 1, further comprising:

a means for transferring a multicast reception inquiry packet from an LNS to each subscriber terminal through an L2TP tunnel and an L2TP session which have already been formed for each subscriber terminal, in order to check whether any subscriber terminal wants to receive a multicast packet from the LNS.

4. A packet transfer apparatus according to claim 1, further comprising:

a means for checking the header and/or the data block of a packet received from an added subscriber terminal to see whether a multicast reception request message is included, and for terminating any packet which includes a multicast reception request message without performing L2TP encapsulation, a means for checking the LNS-multicast group information table to see whether an L2TP connection for a multicast group has already been made, and a means for adding the line information of the added subscriber terminal to the multicast table, as a distribution destination of the multicast group, if it is determined that an L2TP connection for the multicast group has already been made.

5. A packet transfer apparatus according to claim 1, further comprising:

a means for checking the header and/or the data block of a packet received from the subscriber terminal to be deleted to see whether a multicast leave message is included and for terminating a packet which includes a multicast leave message without performing L2TP encapsulation, and a means for deleting the line information of the subscriber terminal to be deleted, from a distribution destination of the multicast group in the multicast table.

6. A packet transfer apparatus according to claim 5, further comprising:

a means for deleting the line information of a subscriber terminal which is remaining as one and the last distribution destination of a multicast group, from the multicast group in the multicast table, if a multicast leave message is received from the last subscriber and for recognizing that there is no more subscriber terminal in the multicast group, a means for sending a multicast leave message to the LNS, in order to indicate that the multicast group is left, a means for releasing the L2TP connection made for the multicast packet, and a means for deleting the information of the corresponding multicast L2TP connection from the L2TP decapsulation table and for setting the multicast session established flag of the corresponding entry of the LNS-multicast group table to a value indicating that the session has not yet been established.

7. A packet transfer apparatus according to claim 1, wherein multiple multicast packet transfer lines are concentrated to a single LNS, by setting the same LNS address to which a multicast L2TP connection is made, in a plurality of entries of the LNS-multicast information table, corresponding to the address of the LNS which the subscriber belongs to and the multicast group address.

8. A packet transfer apparatus according to claim 1, further comprising a line fault detection means, wherein a plurality of LNS addresses to which multicast L2TP connections are made are specified in entries of the LNS-multicast information table, corresponding to the address of the LNS which the subscriber belongs to and the multicast group address, and if a fault is detected in one L2TP connection, the LNS-multicast group information table is searched through by the address of the LNS which the subscriber belongs to and the multicast group address used by the subscriber, and another multicast L2TP connection is made to transfer a multicast packet.

* * * * *